US012784184B2

(12) United States Patent
Kobayashi et al.

(10) Patent No.: US 12,784,184 B2
(45) Date of Patent: Nov. 3, 2026

(54) DEFECT INSPECTION APPARATUS AND DEFECT INSPECTION METHOD

(71) Applicant: Hitachi Astemo, Ltd., Hitachinaka (JP)

(72) Inventors: Yoshihiko Kobayashi, Hitachinaka (JP); Takateru Seki, Hitachinaka (JP); Takahiro Fujioka, Hitachinaka (JP); Takamasa Imaizumi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 218 days.

(21) Appl. No.: 18/846,003

(22) PCT Filed: Jun. 7, 2023

(86) PCT No.: PCT/JP2023/021136

§ 371 (c)(1),
(2) Date: Sep. 11, 2024

(87) PCT Pub. No.: WO2023/248795

PCT Pub. Date: Dec. 28, 2023

(65) Prior Publication Data

US 2025/0191173 A1 Jun. 12, 2025

(30) Foreign Application Priority Data

Jun. 20, 2022 (JP) ................................ 2022-098638

(51) Int. Cl.
*G06T 7/00* (2017.01)
*G01N 21/88* (2006.01)
(Continued)

(52) U.S. Cl.
CPC ......... *G06T 7/001* (2013.01); *G01N 21/8851* (2013.01); *G06V 10/25* (2022.01);
(Continued)

(58) Field of Classification Search
CPC ......... G06T 7/0002; G06T 2207/20084; G06T 2207/30108; G06V 10/60; G06V 10/82;
(Continued)

(56) References Cited

U.S. PATENT DOCUMENTS

2011/0193952 A1* 8/2011 Kozakai ................ G01N 21/95
382/152
2024/0035986 A1* 2/2024 Fujioka ................ G01N 21/952

FOREIGN PATENT DOCUMENTS

JP 2021-56183 4/2021
WO WO-2009148862 A2 * 12/2009 ............ G01B 11/24

OTHER PUBLICATIONS

Clements, et al. (Computer English Translation of WO2009/148862). (Year: 2009).*

(Continued)

*Primary Examiner* — Daniel G Mariam
(74) *Attorney, Agent, or Firm* — Wenderoth, Lind & Ponack, L.L.P.

(57) ABSTRACT

The present invention is directed to providing a defect inspection apparatus and a defect inspection method capable of improving determination accuracy of an inspection. A defect inspection method includes causing a defect inspection apparatus to perform an image acquisition step of changing a relative pose between an inspection target and an imaging portion and capturing an image each time the relative pose is changed, thereby acquiring a plurality of images, a feature amount acquisition step of acquiring a specific feature acquired by scanning each of the plurality of images as a first feature amount, a waveform data acquisition step of acquiring first waveform data in which the first feature amount is arranged in an order of a change in the relative pose, and a defect determination step of determining a defect according to the first waveform data.

12 Claims, 19 Drawing Sheets

(51) Int. Cl.
*G06V 10/25* (2022.01)
*G06V 10/60* (2022.01)
*G06V 10/77* (2022.01)
*G06V 10/82* (2022.01)

(52) U.S. Cl.
CPC .......... *G06V 10/60* (2022.01); *G06V 10/7715* (2022.01); *G01N 2021/8887* (2013.01); *G06T 2207/10024* (2013.01); *G06T 2207/20084* (2013.01); *G06T 2207/30108* (2013.01); *G06V 10/82* (2022.01)

(58) Field of Classification Search
CPC ............... G01N 21/88; G01N 21/8851; G01N 2021/8887
See application file for complete search history.

(56) References Cited

OTHER PUBLICATIONS

International Search Report issued Aug. 8, 2023 in International Application No. PCT/JP2023/021136, with English translation.
Written Opinion of the International Searching Authority issued Aug. 8, 2023 in International Application No. PCT/JP2023/021136, with English translation.

* cited by examiner

THE LUMINANCE DISPERSION (THE STANDARD DEVIATION OF THE LUMINANCE DISTRIBUTION) σ IS HIGH AT A STAIN.
THE LUMINANCE DISPERSION (THE STANDARD DEVIATION OF THE LUMINANCE DISTRIBUTION) σ IS LOW AT A DEFECT.

Fig. 11

A STAIN IS SMALL IN WIDTH, AREA, AND/OR THE LIKE.
A DEFECT IS LARGE IN WIDTH, AREA, AND/OR THE LIKE.

(MACHINED SURFACE 1)

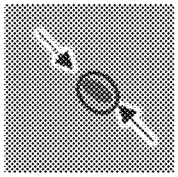

(MACHINED SURFACE 1)

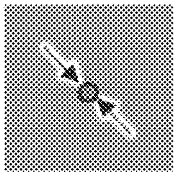

DEFECT REGION IDENTIFICATION STEP

ACQUIRE THE WIDTH, AREA, AND/OR THE LIKE OF A PIXEL REGION HAVING A PREDETERMINED OR LOWER LUMINANCE IN THE PLURALITY OF DEFECT REGIONS AS THE FEATURE AMOUNT, AND GENERATE WAVEFORM DATA BASED ON THEM

FEATURE AMOUNT ACQUISITION STEP & WAVEFORM DATA ACQUISITION STEP

DEFECT DETERMINATION USING RNN

DETERMINED TO BE DEFECTIVE (A DEFECT) BECAUSE THE WIDTH, THE AREA, AND/OR THE LIKE ARE LARGE

DEFECT DETERMINATION USING RNN

DETERMINED TO BE NON-DEFECTIVE (A STAIN) BECAUSE THE WIDTH, THE AREA, AND/OR THE LIKE ARE SMALL

DEFECT DETERMINATION STEP

DEFECT INSPECTION APPARATUS AND DEFECT INSPECTION METHOD

TECHNICAL FIELD

The present invention relates to a defect inspection apparatus and a defect inspection method.

BACKGROUND ART

PTL 1 discloses an apparatus for detecting a defect on a surface of work. This apparatus acquires a plurality of images with respect to a measurement target portion of the work in a state that a bright and dark pattern created by an illumination device is moved relative to the work targeted for the detection of the surface defect, extracts a feature point in the image by performing binarization processing and applying a threshold value on each of the images, acquires a multi-dimensional feature amount with respect to each feature point, and extracts a tentative defect candidate. If the number of images in which the tentative defect candidate matches estimated coordinates is a preset threshold value or more among a plurality of images in which the tentative defect candidate is extracted, the apparatus determines that the tentative defect candidate is a defect candidate, synthesizes the plurality of images containing the determined defect candidate to generate a synthesized image, and detects the defect based on the generated synthesized image.

CITATION LIST

Patent Literature

PTL 1: Japanese Patent Application Laid-Open No. 2021-56183

SUMMARY OF INVENTION

Technical Problem

However, the surface defect inspection apparatus disclosed in PTL 1 may end up erroneously detecting the defect because synthesizing the plurality of images containing the determined defect candidate to generate the synthesized image and detecting the defect based on the single generated synthesized image.

One of objects of the present invention is to provide a defect inspection apparatus and a defect inspection method capable of improving determination accuracy of an inspection.

Solution to Problem

According to one aspect of the present invention, a defect inspection method includes causing a defect inspection apparatus to perform an image acquisition step of changing a relative pose between an inspection target and an imaging portion and capturing an image each time the relative pose is changed, thereby acquiring a plurality of images, a feature amount acquisition step of acquiring a specific feature acquired by scanning each of the plurality of images as a first feature amount, a waveform data acquisition step of acquiring first waveform data in which the first feature amount is arranged in an order of a change in the relative pose, and a defect determination step of determining a defect according to the first waveform data.

Therefore, according to the one aspect of the present invention, the determination accuracy of the inspection can be improved by determining a stain or a defect according to the first waveform data in which the first feature amount is arranged in the order of the change in the relative pose.

BRIEF DESCRIPTION OF DRAWINGS

FIG. 11 is a time chart illustrating geometric characteristics (the first feature amount) and the operation of a defect inspection method according to a fourth embodiment.

DESCRIPTION OF EMBODIMENTS

First Embodiment

Figure 1:
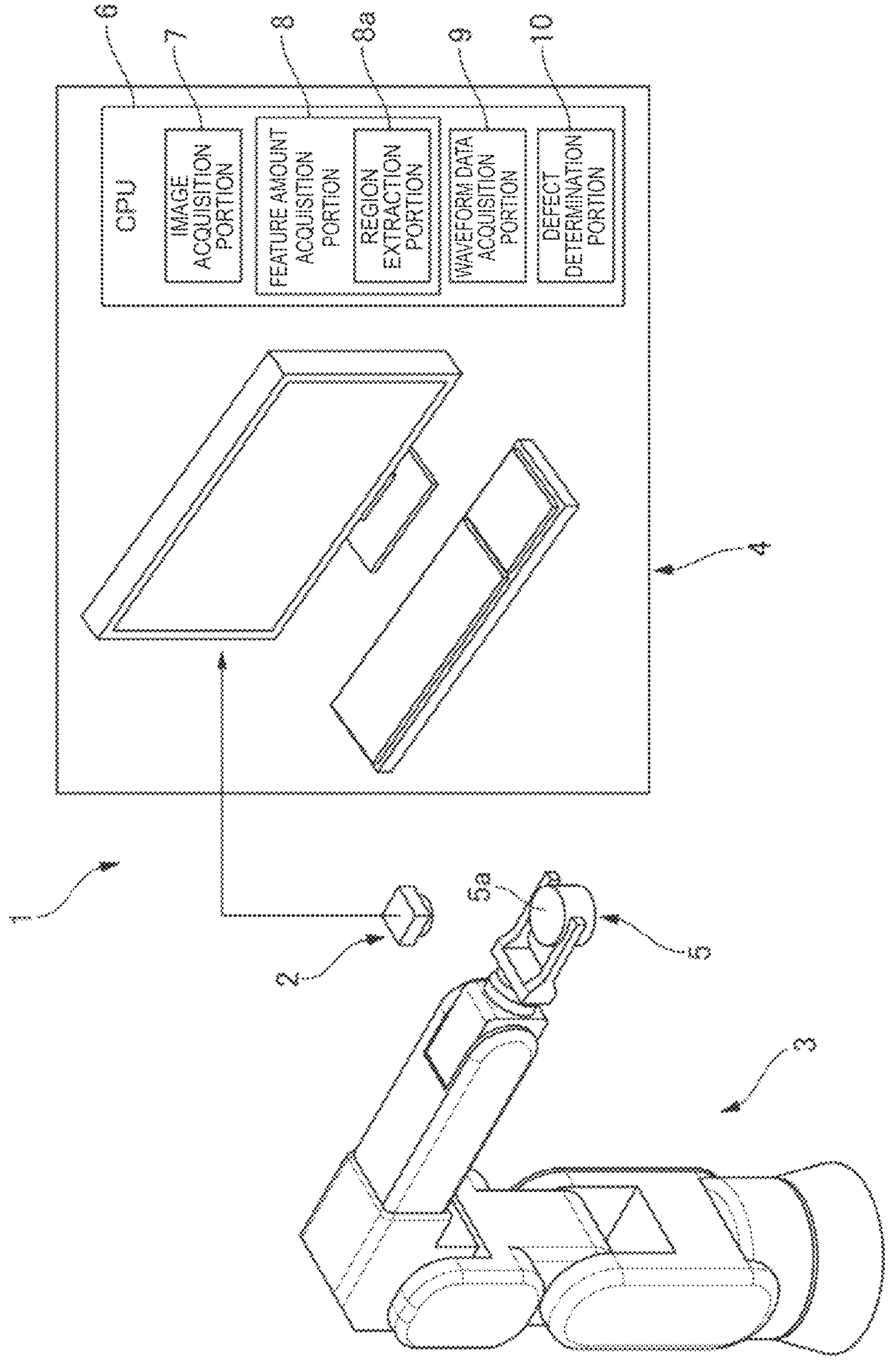
FIG. 1 is an overall view of a defect inspection apparatus according to a first embodiment.

FIG. 1 is an overall view of a defect inspection apparatus according to a first embodiment.

An inspection apparatus 1 according to the first embodiment includes a camera (an imaging portion) 2, a robot 3, and a computer 4.

The camera 2 captures an image of a crown surface 5*a* of a piston (an inspection target) 5.

The crown surface 5*a* of the piston 5 has a machined surface and an as-cast surface significantly different from each other in surface property.

The robot 3 changes the pose (the angle) of the piston 5 relative to the camera 2.

The computer 4 is, for example, a personal computer, and includes a CPU 6.

The CPU 6 includes an image acquisition portion 7, a feature amount acquisition portion 8 including a region extraction portion 8*a*, a waveform data acquisition portion 9, and a defect determination portion 10.

The image acquisition portion 7 acquires a plurality of images of the crown surface 5*a* of the piston 5 captured by the camera 2 (an image acquisition step).

The region extraction portion 8*a* extracts and identifies a defect candidate region by means of machine learning and/or image processing (a defect candidate region identification step).

The machine learning is, for example, learning using a neural network, and a CNN (Convolutional Neural Network) is employed in the first embodiment.

The feature amount acquisition portion 8 acquires images of a plurality of defect candidate regions extracted and identified by the region extraction portion 8*a* by means of the machine learning and/or the image processing, and entirely scans a pixel region of each of them, thereby acquiring a luminance difference (a first feature amount) (a feature amount acquisition step).

The luminance difference refers to a difference between a maximum value and a minimum value of acquired luminances.

The waveform data acquisition portion 9 acquires first waveform data in which the acquired first feature amount is arranged in the order of a change in the relative pose (the angle) (a waveform data acquisition step).

The luminance difference is set to zero at an angle number not extracted and identified as the defect candidate region.

The defect determination portion 10 determines a defect based on the shape of the first waveform data by means of the machine learning (a defect determination step).

This machine learning is, for example, learning using a neural network, and an RNN (Recurrent Neural Network) is employed in the first embodiment.

Figure 2:
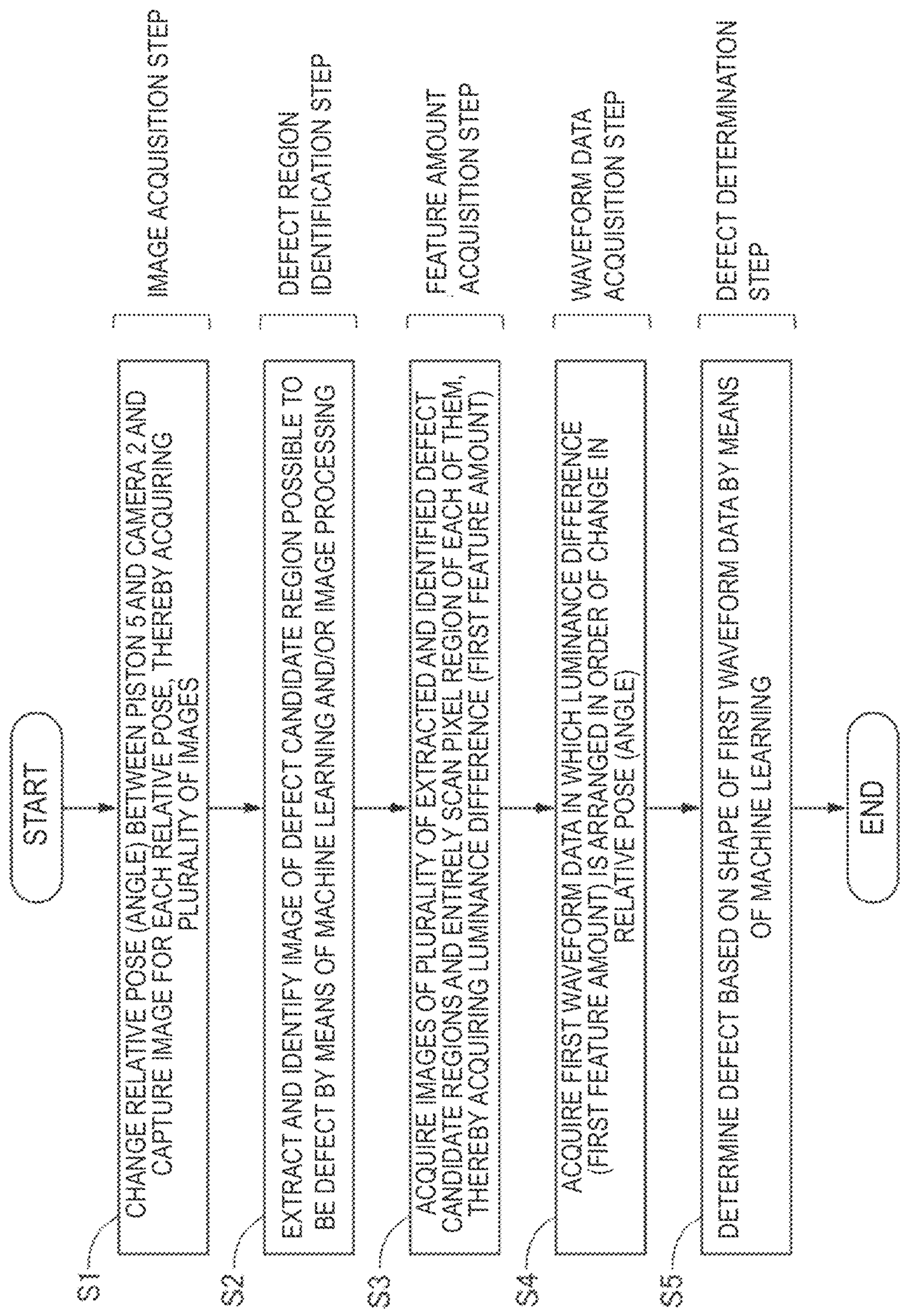
FIG. 2 is a flowchart illustrating the flow of a defect inspection method according to the first embodiment.

FIG. 2 is a flowchart illustrating the flow of a defect inspection method according to the first embodiment.

In step S1, the robot 3 changes the relative pose (the angle) of the piston 5, and the image acquisition portion 7 acquires the plurality of images of the crown surface 5*a* of the piston 5 captured by the camera 2 (the image acquisition step).

More specifically, the total number of relative poses (angles) is 25 angles.

In step S2, the region extraction portion 8*a* extracts and identifies the defect candidate region by means of the machine learning and/or the image processing (the defect candidate region identification step).

In step S3, the feature amount acquisition portion 8 acquires the images of the plurality of defect candidate regions extracted and identified by the region extraction portion 8*a* by means of the machine learning and/or the image processing, and entirely scans the pixel region of each of them, thereby acquiring the luminance difference (the feature amount acquisition step).

In Step S4, the waveform data acquisition portion 9 acquires the first waveform data in which the acquired luminance difference is arranged in the order of the change in the relative pose (the angle) (the waveform data acquisition step).

The luminance difference is set to zero at an angle number not extracted and identified as the defect candidate region.

In step S5, the defect determination portion 10 determines a defect based on the shape of the first waveform data by means of the machine learning (the defect determination step).

Figure 3:
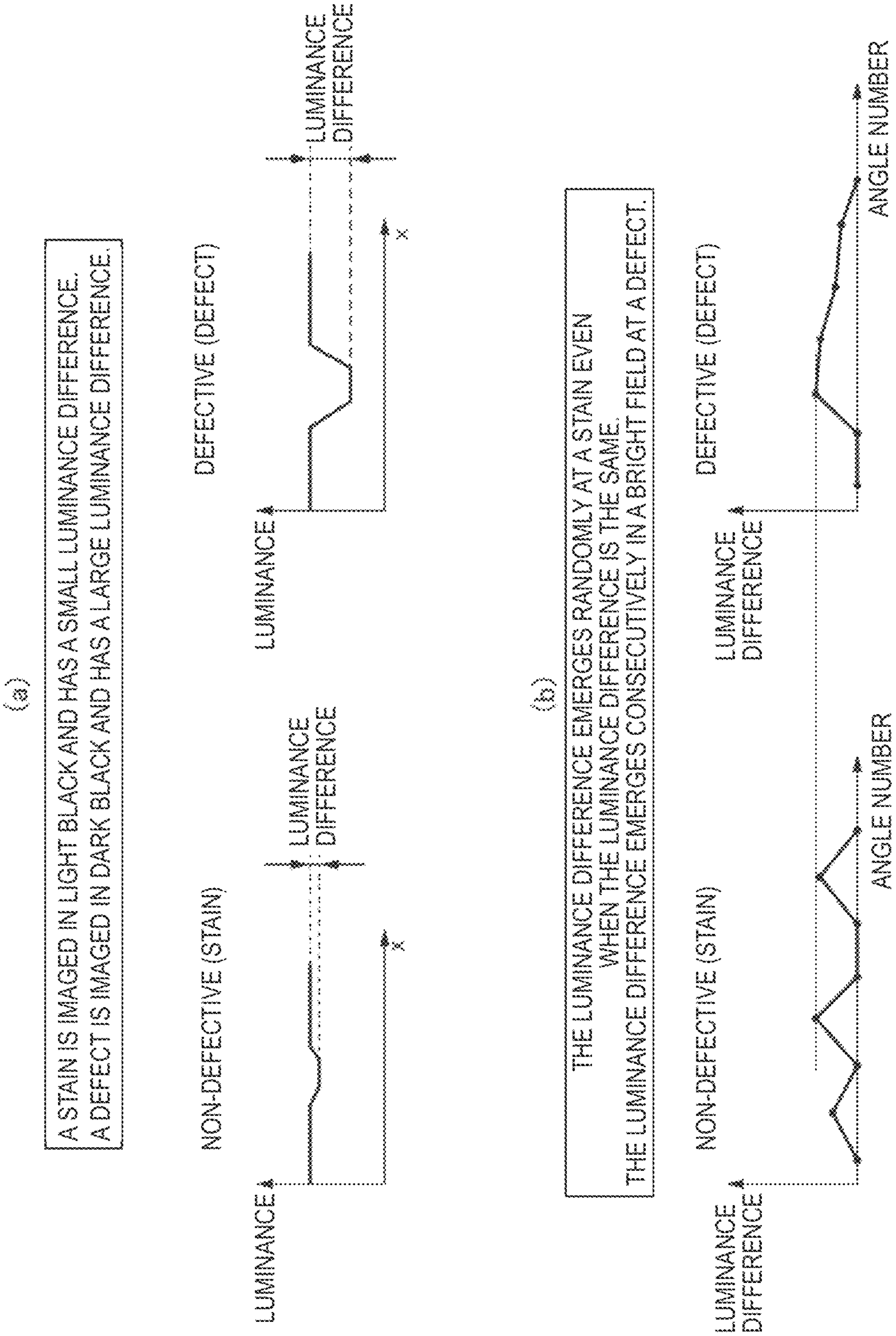
FIG. 3 illustrates characteristics of a luminance difference (a first feature amount) according to the first embodiment.

FIG. 3 illustrates characteristics of the luminance difference (the first feature amount) according to the first embodiment.

More specifically, the luminance difference has such characteristics that the luminance difference is small at a stain because the stain is imaged in light black and the luminance difference is large at a defect because the defect is imaged in dark black as illustrated in FIG. 3(*a*).

Further, the luminance difference has such characteristics that the luminance difference emerges randomly at a stain and emerges consecutively in a bright field at a defect even when the value thereof is the same therebetween as illustrated in FIG. 3(*b*).

Figure 4:
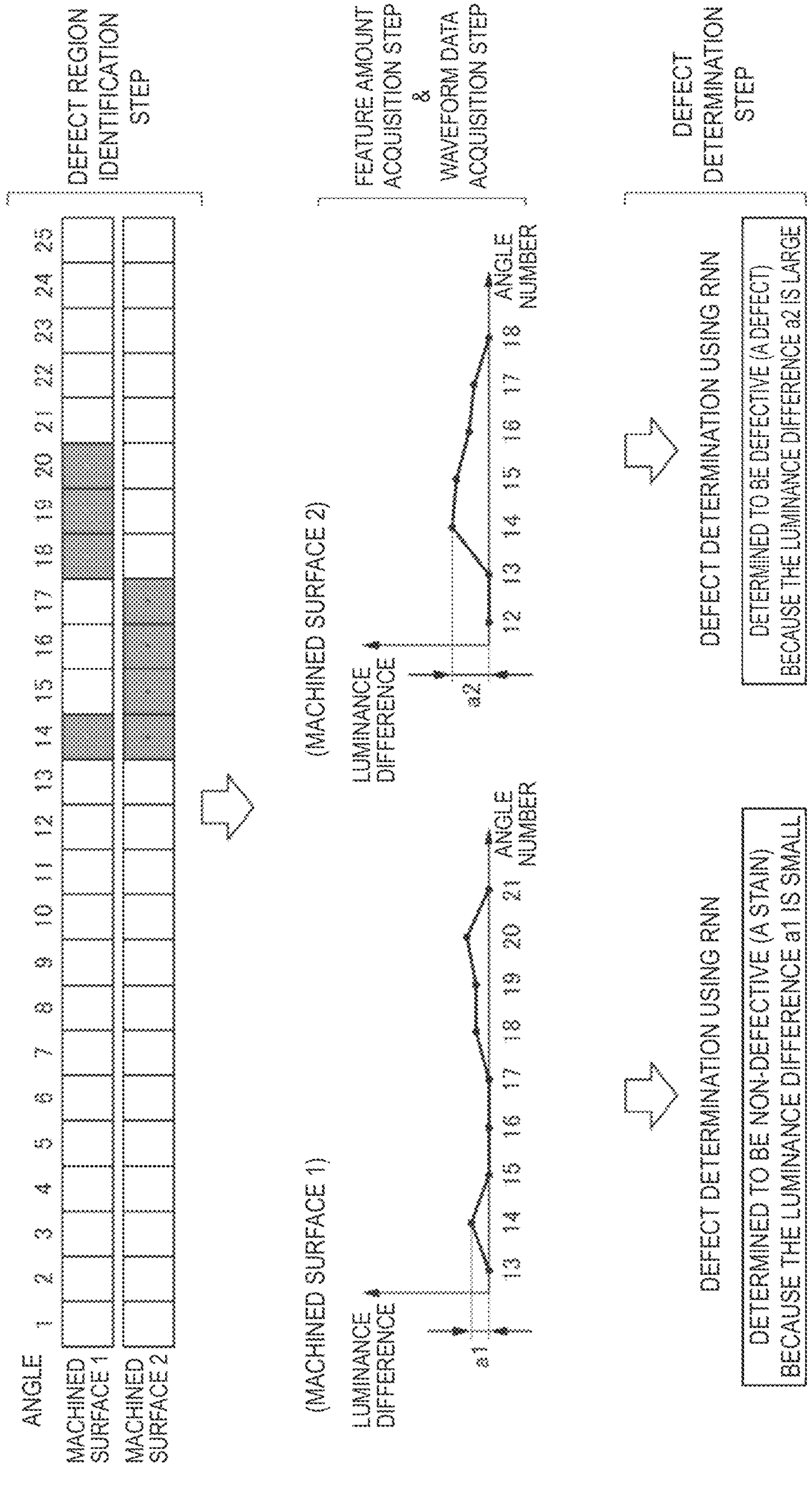
FIG. 4 is a first time chart illustrating the operation of the defect inspection method according to the first embodiment.

FIG. 4 is a first time chart illustrating the operation of the defect inspection method according to the first embodiment.

More specifically, FIG. 4 illustrates the operation of the defect inspection method on machined surfaces of the piston 5.

In the defect candidate region identification step, the region extraction portion 8*a* extracts and identifies images numbered with angle numbers 14 and 18 to 20 as the defect candidate regions for a machined surface 1, and extracts and identifies images numbered with angle numbers 14 to 17 as the defect candidate regions for a machined surface 2.

In the feature amount acquisition step and the waveform data acquisition step, the feature amount acquisition portion 8 acquires the images numbered with the angle numbers 14 and 18 to 20 of the machined surface 1 and the images numbered with the angle numbers 14 to 17 of the machined surface 2 extracted and identified as the defect candidate regions by the region extraction portion 8*a*, and entirely scans the pixel region of each of them, thereby acquiring the luminance difference. Then, the waveform data acquisition portion 9 acquires the first waveform data arranged in the order of the change in the relative pose (the angle).

In the defect determination step, the defect determination portion 10 determines a defect using the RNN (Recurrent Neural Network) based on the acquired first waveform data of the luminance difference.

That is, the defect determination portion 10 determines that the images numbered with the angle numbers 14 and 18 to 20 of the machined surface 1 are non-defective (a stain) because a luminance difference a1 thereof is small, and the images numbered with the angle numbers 14 to 17 of the machined surface 2 are defective (a defect) because a luminance difference a2 thereof is large.

Figure 5:
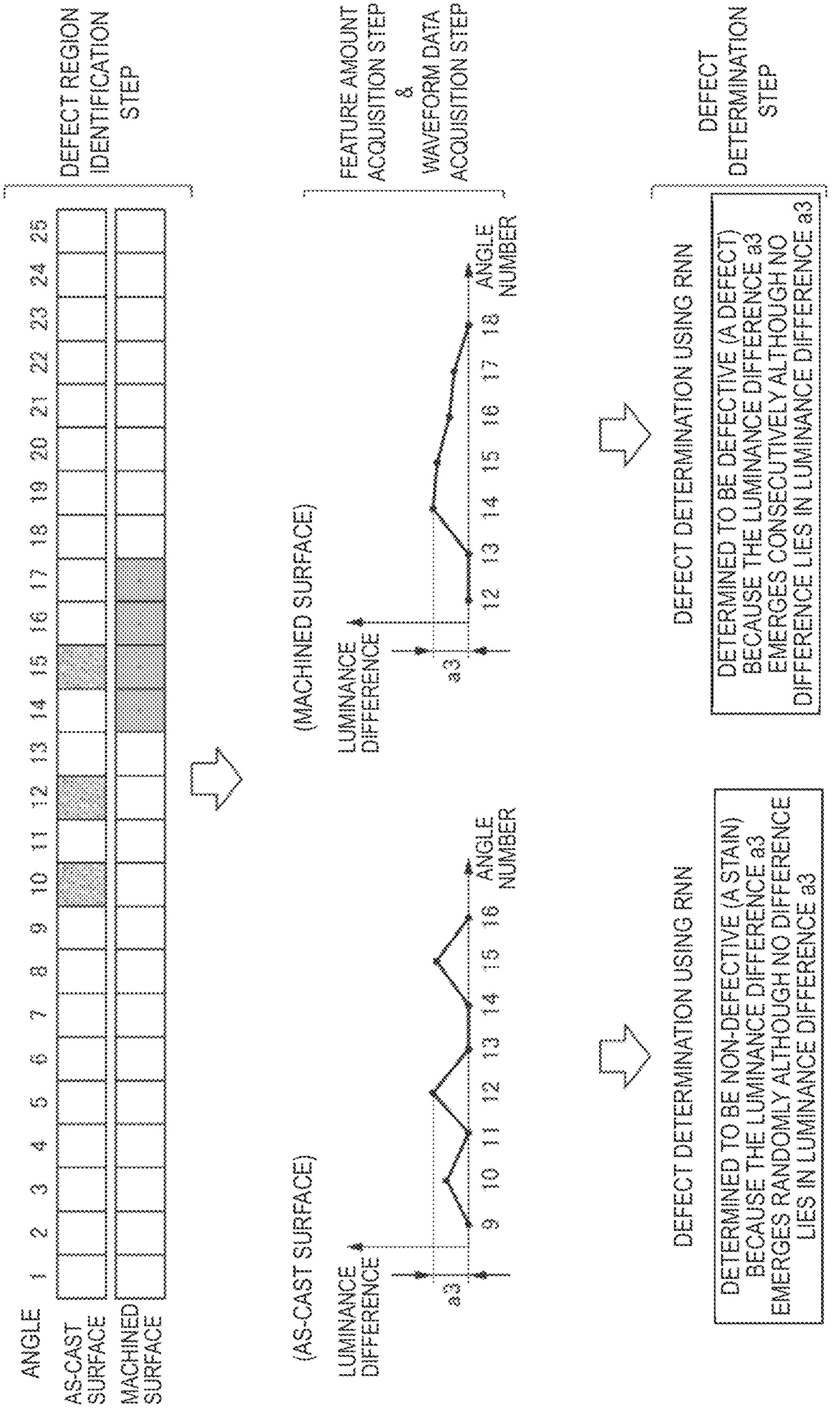
FIG. 5 is a second time chart illustrating the operation of the defect inspection method according to the first embodiment.

FIG. 5 is a second time chart illustrating the operation of the defect inspection method according to the first embodiment.

More specifically, FIG. 5 illustrates the operation of the defect inspection method on an as-cast surface and a machined surface of the piston 5.

In the defect candidate region identification step, the region extraction portion 8*a* extracts and identifies images numbered with angle numbers 10, 12, and 15 as the defect candidate regions for the as-cast surface, and extracts and identifies images numbered with angle numbers 14 to 17 as the defect candidate regions for the machined surface.

In the feature amount acquisition step and the waveform data acquisition step, the feature amount acquisition portion 8 acquires the images numbered with the angle numbers 10, 12, and 15 of the as-cast surface and the images numbered with the angle numbers 14 to 17 of the machined surface extracted and identified as the defect candidate regions by the region extraction portion 8*a*, and entirely scans the pixel region of each of them, thereby acquiring the luminance difference. Then, the waveform data acquisition portion 9 acquires the first waveform data arranged in the order of the change in the relative pose (the angle).

In the defect determination step, the defect determination portion 10 determines a defect using the RNN (Recurrent Neural Network) based on the acquired first waveform data of the luminance.

That is, no difference lies between a luminance difference a3 of the images numbered with the angle numbers 10, 12, and 15 of the as-cast surface and the luminance difference a3 of the images numbered with the angle numbers 14 to 17 of the machined surface, but the luminance difference of the as-cast surface emerges randomly while the luminance of the machined surface emerges consecutively.

Therefore, the defect determination portion 10 determines that the images numbered with the angle numbers 10, 12, and 15 of the as-cast surface are non-defective (a stain) and the images numbered with the angle numbers 14 to 17 of the machined surface are defective (a defect).

Next, advantageous effects of the first embodiment will be described.

The first embodiment brings about the following advantageous effects.

(1) The defect inspection apparatus 1 is configured to include the image acquisition portion 7, the feature amount acquisition portion 8, the waveform data acquisition portion 9, and the defect determination portion 10. The image acquisition portion 7 changes the relative pose between the piston 5 and the camera 2 and captures the image for each relative pose, thereby acquiring the plurality of images. The feature amount acquisition portion 8 acquires the luminance difference as the first feature amount acquired by entirely scanning the pixel region of each of the plurality of images. The waveform data acquisition portion 9 acquires the first waveform data in which the luminance difference is arranged in the order of the change in the relative pose. The defect determination portion 10 determines a defect according to how large the luminance difference is, which is indicated by the first waveform data.

Therefore, the first embodiment can improve the determination accuracy of inspecting whether the target is defective (a defect) or non-defective (a stain).

(2) The first embodiment is configured to assume that luminance difference is the difference between the maximum value and the minimum value of the luminances acquired by entirely scanning the pixel region of each of the plurality of images.

Therefore, the first embodiment can further improve the determination accuracy of the inspection, because the luminance more sharply changes as the difference increases between the maximum value and the minimum value of the luminances.

(3) The region extraction portion 8*a* of the feature amount acquisition portion 8 is configured to extract and identify the defect candidate region using the CNN (Convolutinal Neural Network), which is machine learning.

Therefore, the first embodiment facilitates the determination about a defect.

(4) The defect determination portion 10 is configured to determine a defect according to how large the luminance difference is and how the luminance difference emerges (randomly or consecutively).

Therefore, the first embodiment can further improve the determination accuracy of inspecting whether the target is defective (a defect) or non-defective (a stain).

Second Embodiment

Figure 6:
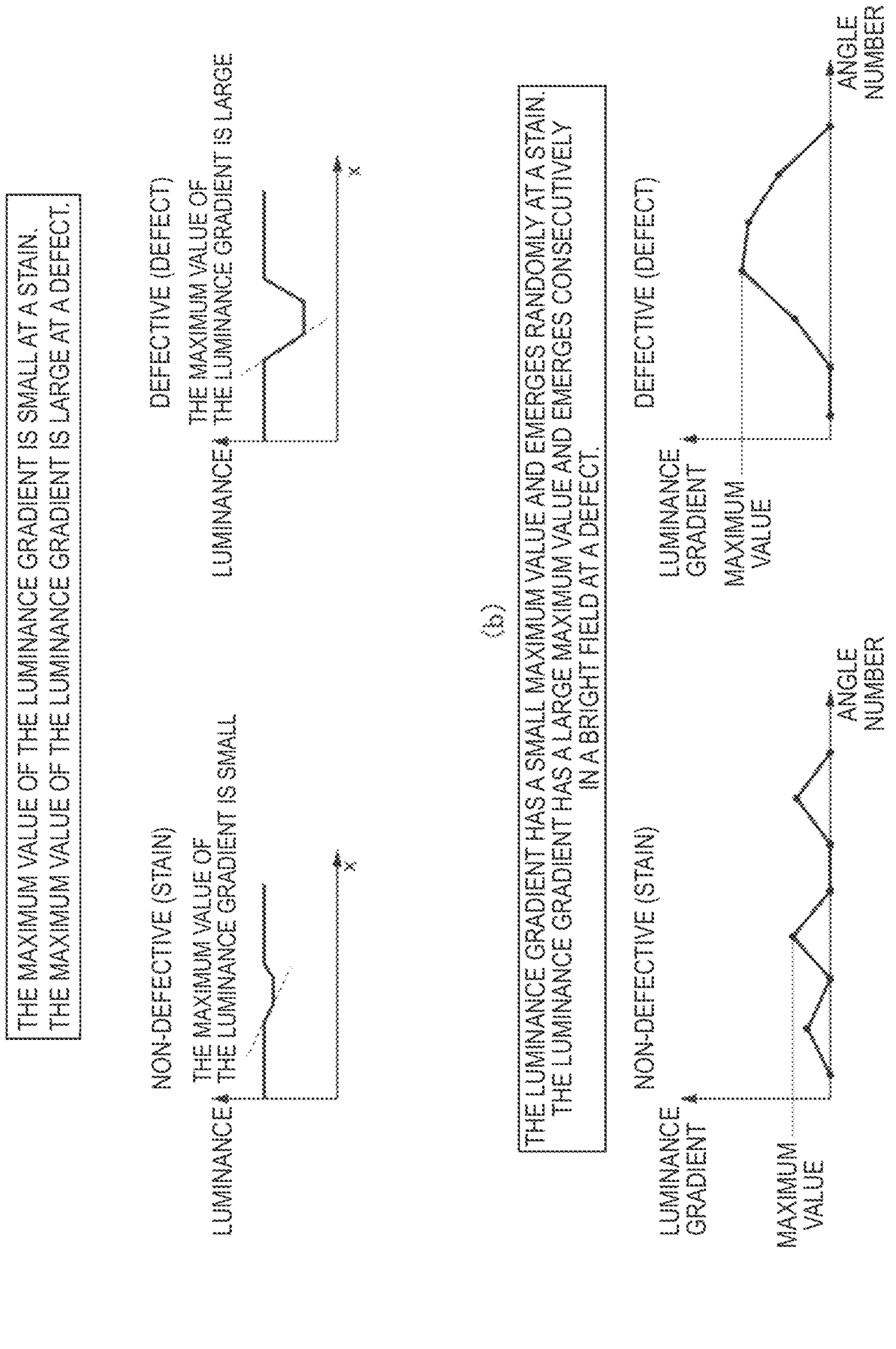
FIG. 6 illustrates characteristics of a luminance gradient (the first feature amount) according to a second embodiment.

FIG. 6 illustrates characteristics of a luminance gradient (the first feature amount) according to a second embodiment.

More specifically, the luminance gradient has such characteristics that the maximum value of the luminance gradient is small at a stain and the maximum value of the luminance gradient is large at a defect as illustrated in FIG. 6(*a*).

Further, the luminance gradient has such characteristics that the luminance gradient emerges randomly at a stain and emerges consecutively in a bright field at a defect as illustrated in FIG. 6(*b*), similarly to the characteristics of the luminance difference.

Figure 7:
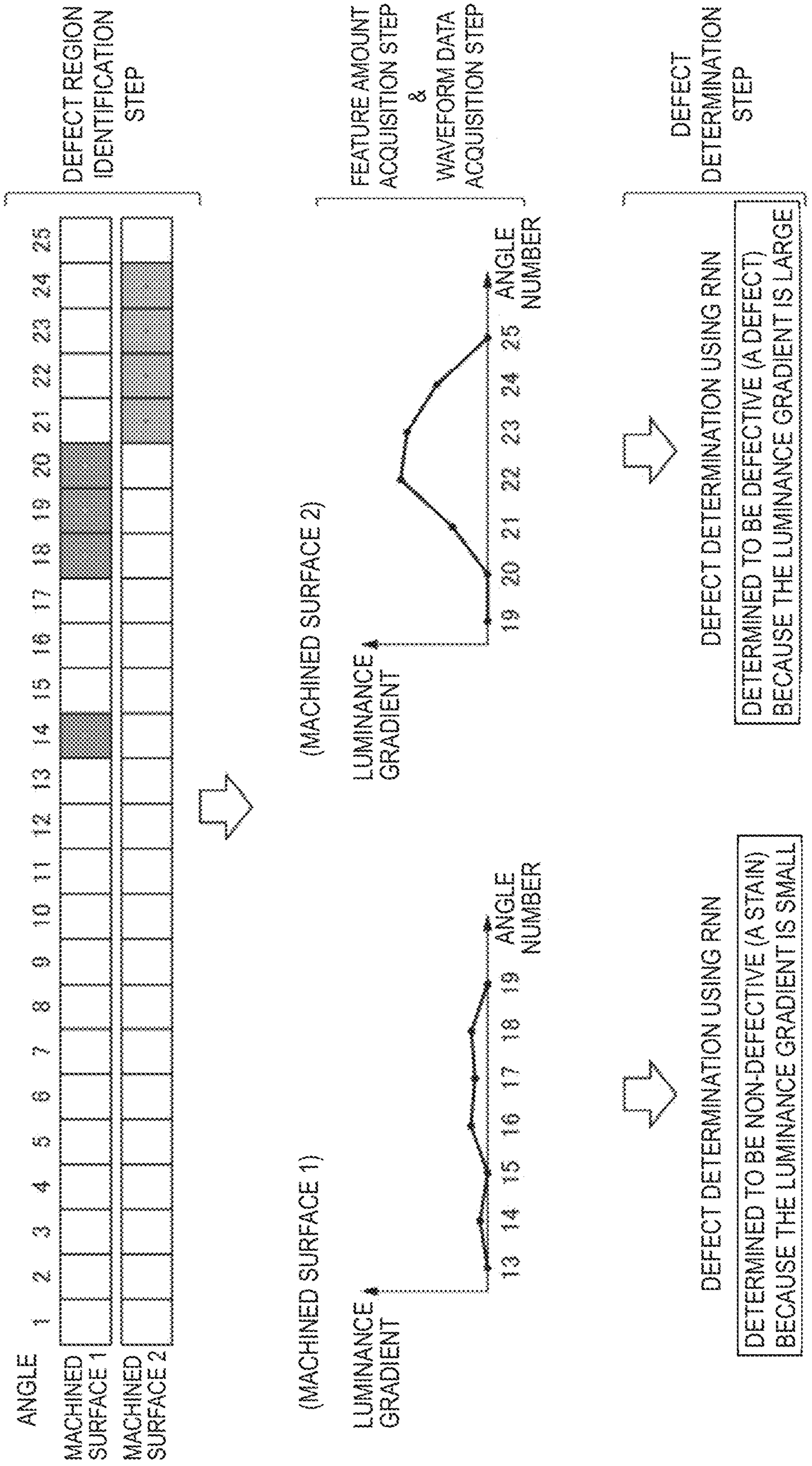
FIG. 7 is a first time chart illustrating the operation of a defect inspection method according to the second embodiment.

FIG. 7 is a first time chart illustrating the operation of a defect inspection method according to the second embodiment.

More specifically, FIG. 7 illustrates the operation of the defect inspection method on the machined surfaces of the piston 5.

In the defect candidate region identification step, the region extraction portion 8*a* extracts and identifies images numbered with angle numbers 14 and 18 to 20 as the defect candidate regions for the machined surface 1, and extracts and identifies images numbered with angle numbers 21 to 24 as the defect candidate regions for the machined surface 2.

In the feature amount acquisition step and the waveform data acquisition step, the feature amount acquisition portion 8 acquires the images numbered with the angle numbers 14 and 18 to 20 of the machined surface 1 and the images numbered with the angle numbers 21 to 24 of the machined surface 2 extracted and identified as the defect candidate regions by the region extraction portion 8*a*, and entirely scans the pixel region of each of them, thereby acquiring the luminance gradient. Then, the waveform data acquisition portion 9 acquires the first waveform data arranged in the order of the change in the relative pose (the angle).

The luminance gradient is set to zero at an angle number not extracted and identified as the defect candidate region.

In the defect determination step, the defect determination portion 10 determines a defect using the RNN (Recurrent Neural Network) based on the acquired first waveform data of the luminance gradient.

That is, the defect determination portion 10 determines that the images numbered with the angle numbers 14 and 18 to 20 of the machined surface 1 are non-defective (a stain) because the luminance gradient thereof is small, and the images numbered with the angle numbers 21 to 24 of the machined surface 2 are defective (a defect) because the luminance gradient thereof is large.

Figure 8:
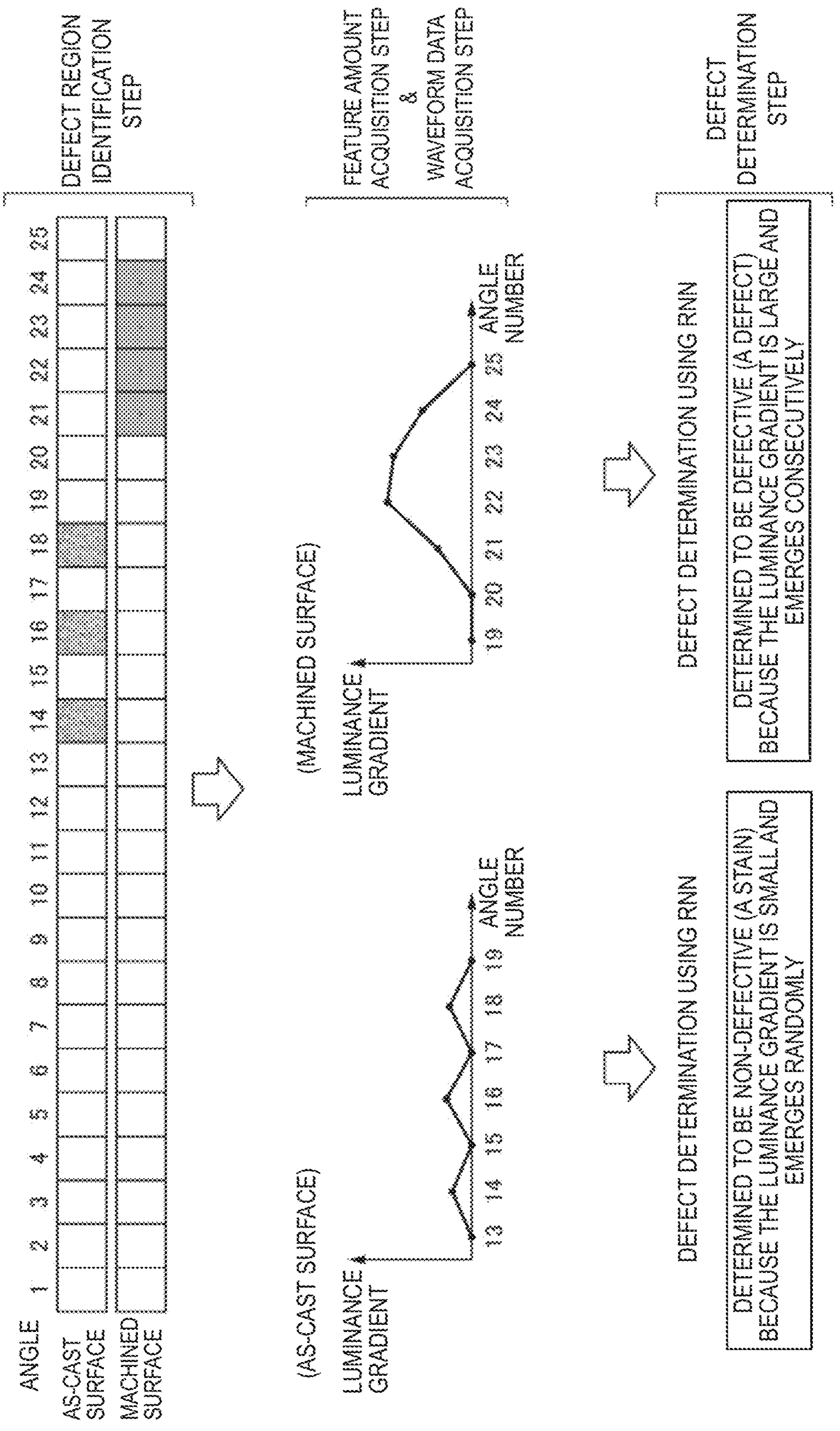
FIG. 8 is a second time chart illustrating the operation of the defect inspection method according to the second embodiment.

FIG. 8 is a second time chart illustrating the operation of the defect inspection method according to the second embodiment.

More specifically, FIG. 8 illustrates the operation of the defect inspection method on the as-cast surface and the machined surface of the piston 5.

In the defect candidate region identification step, the region extraction portion 8*a* extracts and identifies images numbered with angle numbers 14, 16, and 18 as the defect candidate regions for the as-cast surface, and extracts and identifies images numbered with angle numbers 21 to 24 as the defect candidate regions for the machined surface.

In the feature amount acquisition step and the waveform data acquisition step, the feature amount acquisition portion 8 acquires the images numbered with the angle numbers 14, 16, and 18 of the as-cast surface and the images numbered with the angle numbers 21 to 24 of the machined surface extracted and identified as the defect candidate regions by the region extraction portion 8*a*, and entirely scans the pixel region of each of them, thereby acquiring the luminance gradient. Then, the waveform data acquisition portion 9 acquires the first waveform data arranged in the order of the change in the relative pose (the angle).

The luminance gradient is set to zero at an angle number not extracted and identified as the defect candidate region.

In the defect determination step, the defect determination portion 10 determines a defect using the RNN (Recurrent Neural Network) based on the acquired first waveform data of the luminance.

That is, the defect determination portion 10 determines that the images numbered with the angle numbers 14, 16, and 18 of the as-cast surface are non-defective (a stain) because the luminance gradient thereof is small and emerges randomly, and the images numbered with the angle numbers 21 to 24 of the machined surface are defective (a defect) because the luminance gradient thereof is large and emerges consecutively.

In this manner, while the first embodiment uses the luminance difference as the first feature amount, the second embodiment is configured to use the luminance gradient as the first feature amount.

Other than that, the second embodiment is configured similarly to the first embodiment, and therefore similar components to the first embodiment will not be described here while being indicated by the same reference numerals.

Next, advantageous effects of the second embodiment will be described.

The second embodiment can bring about the following advantageous effects similarly to the first embodiment.

(1) The defect inspection apparatus 1 is configured to include the image acquisition portion 7, the feature amount acquisition portion 8, the waveform data acquisition portion 9, and the defect determination portion 10. The image acquisition portion 7 changes the relative pose between the piston 5 and the camera 2 and captures the image for each relative pose, thereby acquiring the plurality of images. The feature amount acquisition portion 8 acquires the luminance gradient as the first feature amount acquired by entirely scanning the pixel region of each of the plurality of images. The waveform data acquisition portion 9 acquires the first waveform data in which the luminance gradient is arranged in the order of the change in the relative pose. The defect determination portion 10 determines a defect according to how large the luminance gradient is, which is indicated by the first waveform data.

Therefore, the second embodiment can improve the determination accuracy of inspecting whether the target is defective (a defect) or non-defective (a stain).

(2) The second embodiment is configured to use the maximum value of the luminance gradient acquired by scanning each of the plurality of images as the luminance gradient.

Therefore, although a plurality of luminance gradients can be acquired, the use of the maximum value can further improve the determination accuracy of inspecting whether the target is defective (a defect) or non-defective (a stain).

(3) The region extraction portion 8*a* of the feature amount acquisition portion 8 is configured to extract and identify the defect candidate region using the CNN (Convolutinal Neural Network), which is machine learning.

Therefore, the second embodiment facilitates the determination about a defect.

(4) The defect determination portion 10 is configured to determine a defect according to how large the luminance gradient is and how the luminance gradient emerges (randomly or consecutively).

Therefore, the second embodiment can further improve the determination accuracy of inspecting whether the target is defective (a defect) or non-defective (a stain).

Third Embodiment

Figure 9:
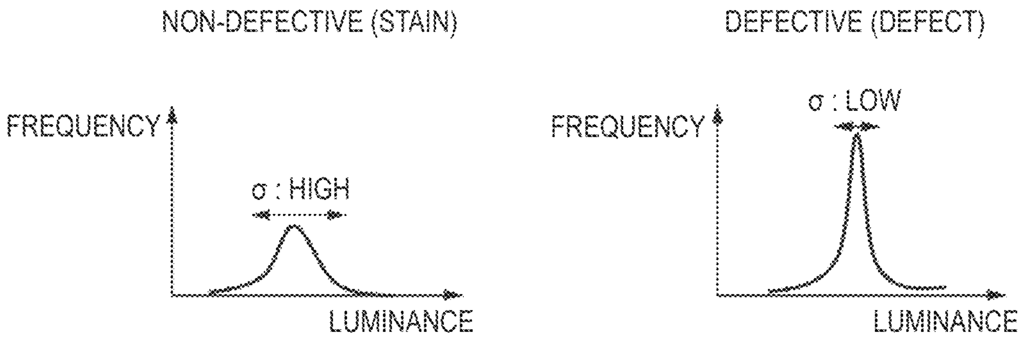
FIG. 9 illustrates characteristics of a luminance dispersion (the first feature amount) according to a third embodiment.

FIG. 9 illustrates characteristics of a luminance dispersion (the first feature amount) according to a third embodiment.

More specifically, the luminance dispersion (a standard deviation of a luminance distribution) $\sigma$ has such characteristics that the luminance dispersion (the standard deviation of the luminance distribution) $\sigma$ is high at a stain and the luminance dispersion (the standard deviation of the luminance distribution) $\sigma$ is low at a defect as illustrated in FIG. 9(*a*).

Figure 10:
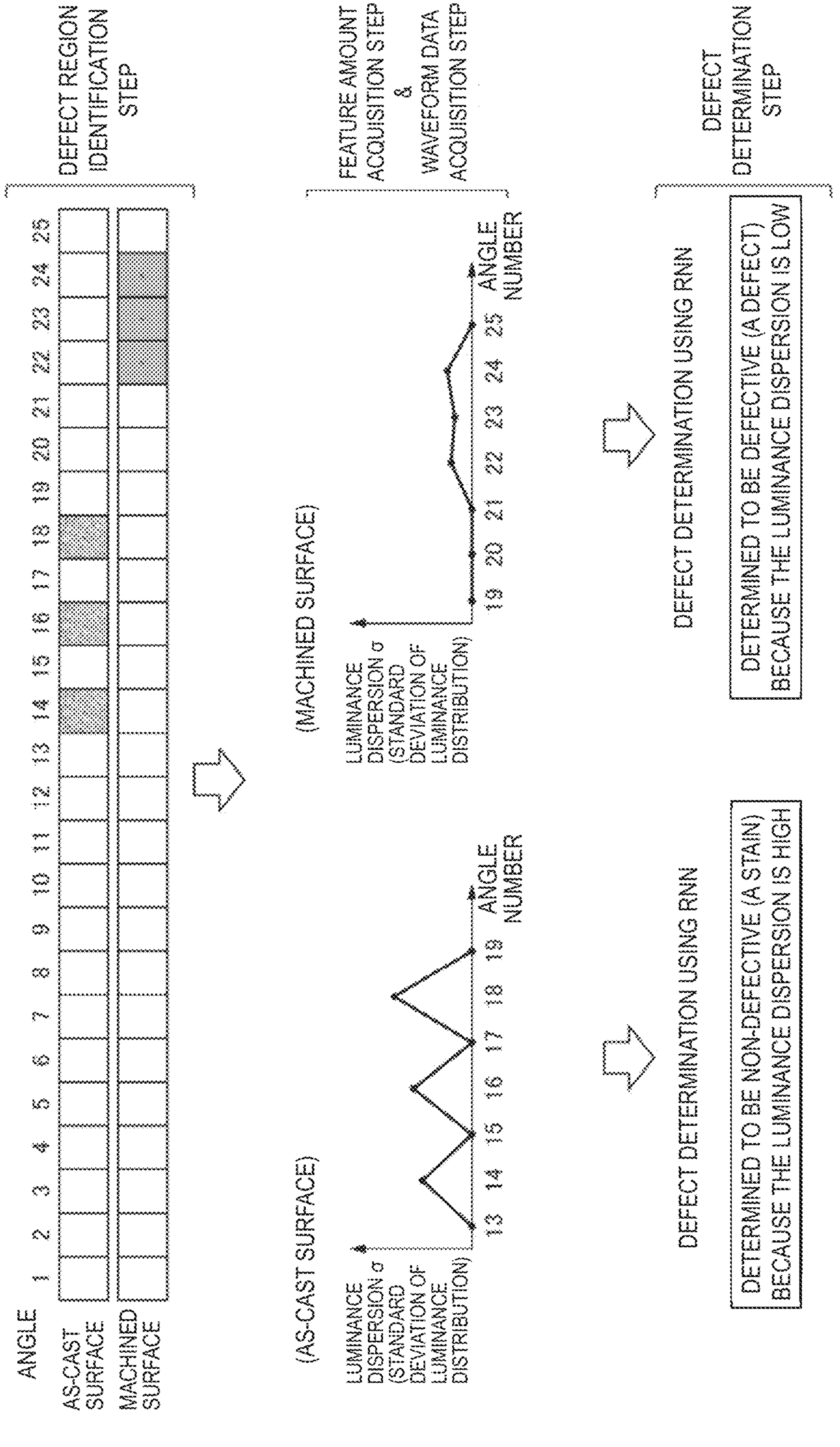
FIG. 10 is a time chart illustrating the operation of a defect inspection method according to the third embodiment.

FIG. 10 is a time chart illustrating the operation of a defect inspection method according to the third embodiment.

More specifically, FIG. 10 illustrates the operation of the defect inspection method on the as-cast surface and the machined surface of the piston 5.

In the defect candidate region identification step, the region extraction portion 8*a* extracts and identifies images numbered with angle numbers 14, 16, and 18 as the defect candidate regions for the as-cast surface, and extracts and identifies images numbered with angle numbers 22 to 24 as the defect candidate regions for the machined surface.

In the feature amount acquisition step and the waveform data acquisition step, the feature amount acquisition portion 8 acquires the images numbered with the angle numbers 14, 16, and 18 of the as-cast surface and the images numbered with the angle numbers 22 to 24 of the machined surface extracted and identified as the defect candidate regions by the region extraction portion 8*a*, and entirely scans the pixel region of each of them, thereby acquiring the luminance dispersion (the standard deviation of the luminance distribution) $\sigma$. Then, the waveform data acquisition portion 9 acquires the first waveform data arranged in the order of the change in the relative pose (the angle).

The luminance dispersion (the standard deviation of the luminance distribution) is set to zero at an angle number not extracted and identified as the defect candidate region.

In the defect determination step, the defect determination portion 10 determines a defect using the RNN (Recurrent Neural Network) based on the acquired waveform data of the luminance.

That is, the defect determination portion 10 determines that the images numbered with the angle numbers 14, 16, and 18 of the as-cast surface are non-defective (a stain) because the luminance dispersion (the standard deviation of the luminance distribution) $\sigma$ is high, and the images numbered with the angle numbers 22 to 24 of the machined surface are defective (a defect) because the luminance dispersion (the standard deviation of the luminance distribution) $\sigma$ is low.

In this manner, while the first embodiment uses the luminance difference as the first feature amount, the third embodiment is configured to use the luminance dispersion (the standard deviation of the luminance distribution) σ as the first feature amount.

Other than that, the third embodiment is configured similarly to the first embodiment, and therefore similar components to the first embodiment will not be described here while being indicated by the same reference numerals.

Therefore, the third embodiment can bring about similar advantageous effects to the first embodiment.

Fourth Embodiment

FIG. 11 is a time chart illustrating geometric characteristics (the first feature amount) and the operation of a defect inspection method according to a fourth embodiment.

More specifically, FIG. 11 illustrates the operation of the defect inspection method on the machined surfaces of the piston 5.

As the geometric characteristics, a stain is characterized by being small in width, area, and/or the like, and a defect is characterized by being large in width and/or area.

In the defect candidate region identification step, the region extraction portion 8*a* extracts and identifies images as the defect candidate regions of the machined surface 1 having a predetermined or lower luminance and extracts and identifies images as the defect candidate regions of the machined surface 2 having the predetermined or lower luminance (FIG. 11 illustrates only images numbered with specific angle numbers). In the feature amount acquisition step and the waveform data acquisition step, the feature amount acquisition portion 8 acquires the plurality of images extracted and identified as the defect candidate regions by the region extraction portion 8*a*, and entirely scans the pixel region of each of them, thereby acquiring the respective geometric characteristics of each of them. Then, the waveform data acquisition portion 9 acquires the first waveform data arranged in the order of the change in the relative pose (the angle).

The geometric characteristics are set to zero at an angle number not extracted and identified as the defect candidate region.

In the defect determination step, the defect determination portion 10 determines a defect using the RNN (Recurrent Neural Network) based on the acquired waveform data of the geometric characteristics.

That is, the defect determination portion 10 determines that the images of the machined surface 1 are defective (a defect) because the geometric characteristics thereof are large in width and/or area, and the images of the machined surface 2 are non-defective (a stain) because the geometric characteristics thereof are small in width and/or area.

In this manner, while the first embodiment uses the luminance difference as the first feature amount, the fourth embodiment is configured to use the geometric characteristics as the first feature amount.

Other than that, the fourth embodiment is configured similarly to the first embodiment, and therefore similar components to the first embodiment will not be described here while being indicated by the same reference numerals.

Therefore, the fourth embodiment can bring about similar advantageous effects to the first embodiment.

Fifth Embodiment

Figure 12:
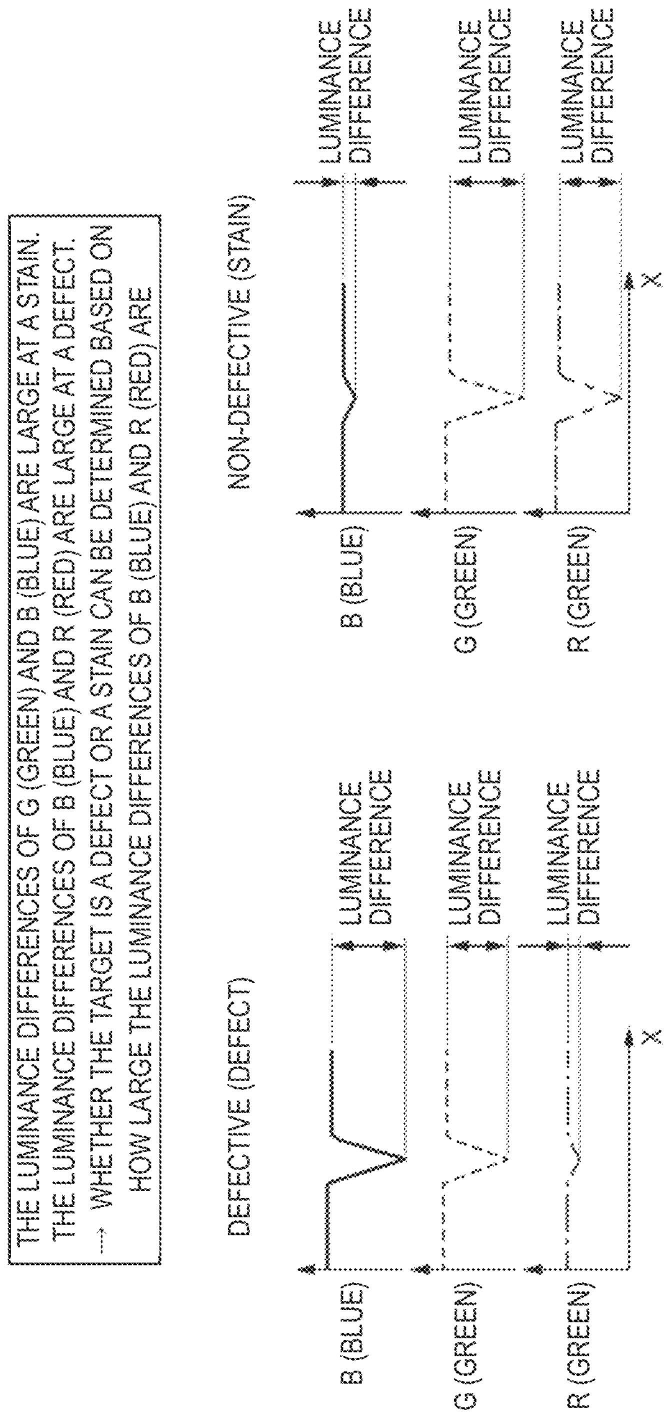
FIG. 12 illustrates characteristics of a color intensity (the first feature amount) according to a fifth embodiment.

FIG. 12 illustrates characteristics of a color intensity (the first feature amount) according to a fifth embodiment.

For example, when the color intensity has such characteristics that luminance differences of G (green) and B (blue) are large at a defect and luminance differences of G (green) and R (red) are large at a stain, this allows whether the target is a defect to be determined based on how large the luminance differences of B (blue) and R (red) are.

Figure 13:
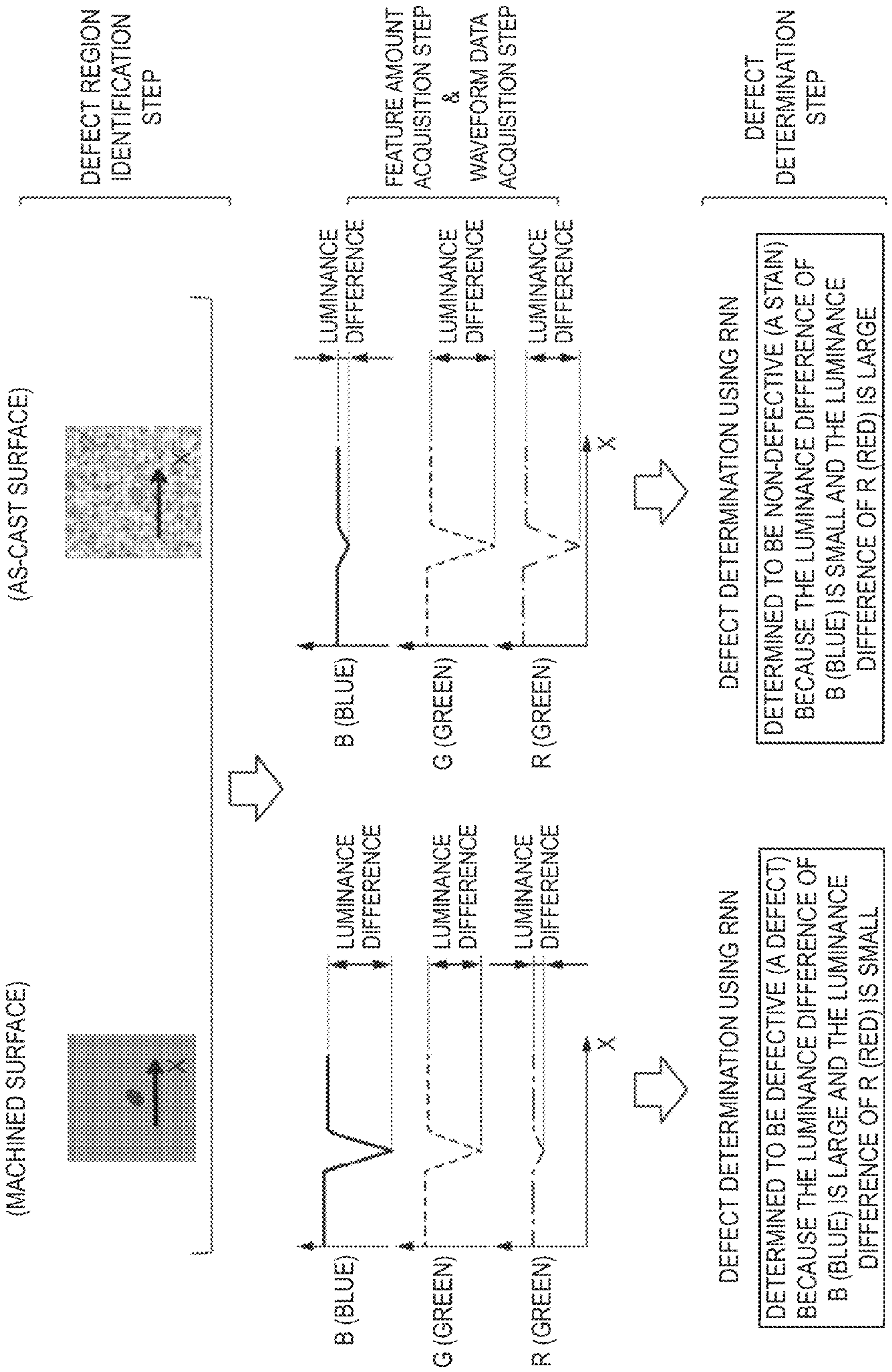
FIG. 13 is a time chart illustrating the operation of a defect inspection method according to the fifth embodiment.

FIG. 13 is a time chart illustrating the operation of a defect inspection method according to the fifth embodiment.

More specifically, FIG. 13 illustrates the operation of the defect inspection method on the machined surface and the as-cast surface of the piston 5.

In the defect candidate region identification step, the region extraction portion 8*a* extracts and identifies images as the defect candidate regions of the machined surface and extracts and identifies images as the defect candidate regions of the as-cast surface (FIG. 13 illustrates only images numbered with specific angle numbers).

In the feature amount acquisition step and the waveform data acquisition step, the feature amount acquisition portion 8 acquires the plurality of images extracted and identified as the defect candidate regions by the region extraction portion 8*a*, and entirely scans the pixel region of each of them, thereby acquiring the color intensity (the luminance difference) of each of them. Then, the waveform data acquisition portion 9 acquires the first waveform data arranged in the order of the change in the relative pose (the angle).

The color intensity (the luminance difference) is set to zero at an angle number not extracted and identified as the defect candidate region.

In the defect determination step, the defect determination portion 10 determines a defect using the RNN (Recurrent Neural Network) based on the acquired waveform data of the intensity (the luminance difference) for each color (RGB).

That is, the defect determination portion 10 determines that the color intensity (the luminance difference) of the images of the machined surface is defective (a defect) because the luminance difference of B (blue) is large and the luminance difference of R (red) is small, and the color intensity (the luminance difference) of the images of the as-cast surface is non-defective (a stain) because the luminance difference of B (blue) is small and the luminance difference of R (red) is large.

In this manner, while the first embodiment uses the luminance difference as the first feature amount, the fifth embodiment is configured to use the color intensity (the luminance difference) as the first feature amount.

Other than that, the fifth embodiment is configured similarly to the first embodiment, and therefore similar components to the first embodiment will not be described here while being indicated by the same reference numerals.

Therefore, the fifth embodiment can bring about similar advantageous effects to the first embodiment.

Sixth Embodiment

Figure 14:
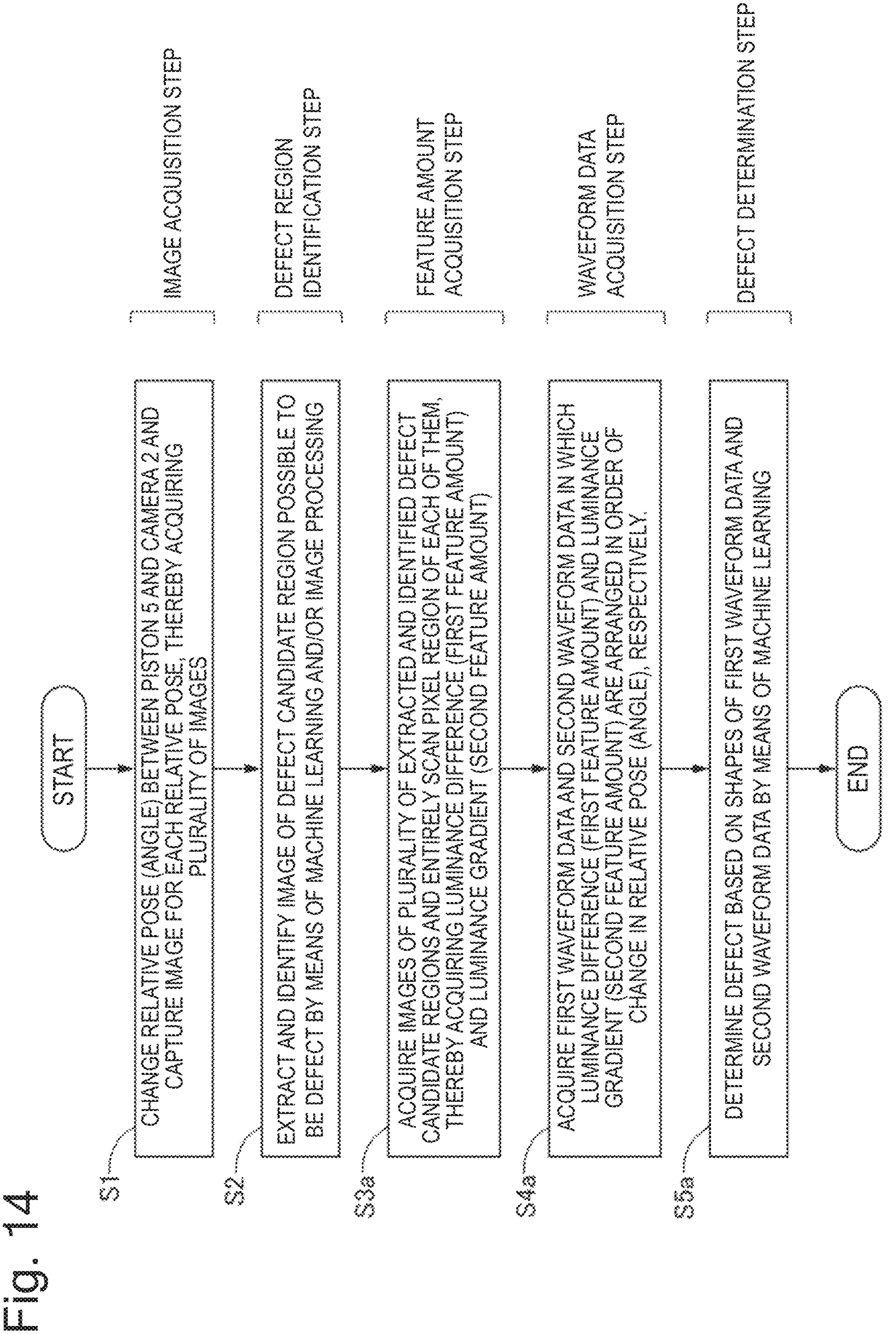
FIG. 14 is a flowchart illustrating the flow of a defect inspection method according to a sixth embodiment.

FIG. 14 is a flowchart illustrating the flow of a defect inspection method according to a sixth embodiment.

The first embodiment uses only the first feature amount but the sixth embodiment is configured to use a second feature amount in addition to the first feature amount.

More specifically, in step S3*a*, the feature amount acquisition portion 8 acquires the plurality of images of the defect candidate regions extracted and identified by the region extraction portion 8*a*, and entirely scans the pixel region of each of them, thereby acquiring the luminance difference (the first feature amount) and the luminance gradient (the second feature amount). In step S4*a*, the waveform data acquisition portion 9 acquires the first waveform data and second waveform data in which the luminance difference (the first feature amount) and the luminance gradient (the second feature amount) are arranged in the order of the change in the relative pose (the angle), respectively. In step S5*a*, the defect determination portion 10 determines a defect based on the shapes of the first waveform data and the second waveform data by means of the machine learning.

Other than that, the sixth embodiment is configured similarly to the first embodiment, and therefore similar components to the first embodiment will not be described here while being indicated by the same reference numerals.

Figure 15:
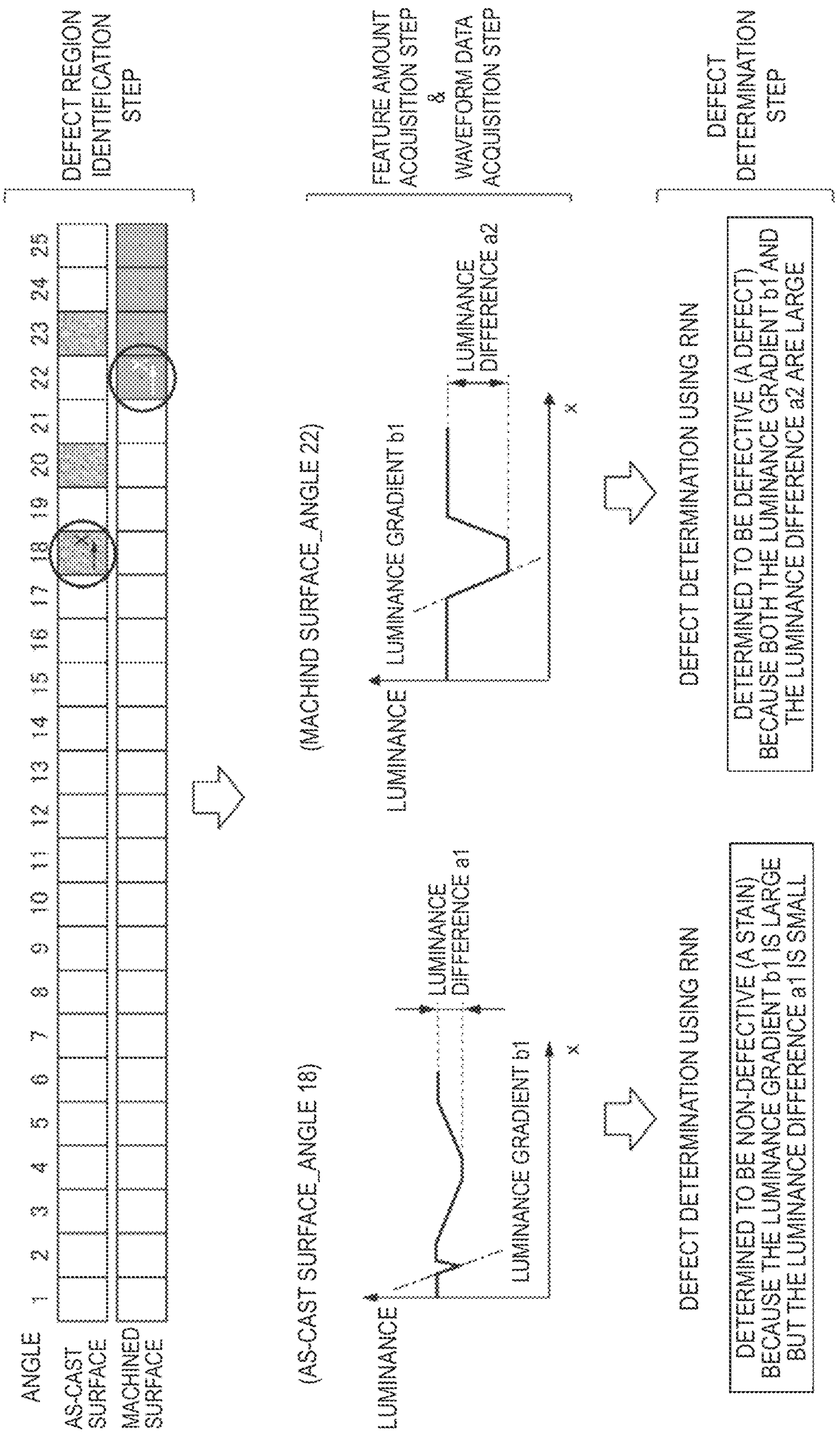
FIG. 15 is a first time chart illustrating the operation of the defect inspection method according to the sixth embodiment.

FIG. 15 is a first time chart illustrating the operation of the defect inspection method according to the sixth embodiment.

More specifically. FIG. 15 illustrates the operation of the defect inspection method on the as-cast surface and the machined surface of the piston 5.

In the defect candidate region identification step, the region extraction portion 8*a* extracts and identifies images numbered with angle numbers 18, 20, and 23 as the defect candidate regions for the as-cast surface, and extracts and identifies images numbered with angle numbers 22 to 25 as the defect candidate regions for the machined surface.

In the feature amount acquisition step and the waveform data acquisition step, the feature amount acquisition portion 8 acquires the images numbered with the angle numbers 18, 20, and 23 of the as-cast surface and the images numbered with the angle numbers 22 to 25 of the machined surface extracted and identified as the defect candidate regions by the region extraction portion 8*a*, and entirely scans the pixel region of each of them, thereby acquiring the luminance difference and the luminance gradient. Then, the waveform data acquisition portion 9 acquires the first waveform data and the second waveform data in which the luminance difference and the luminance gradient are arranged in the order of the change in the relative pose (the angle), respectively.

FIG. 15 illustrates the first waveform data and the second waveform data of the angle number 18 of the as-cast surface and the angle number 22 of the machined surface as representative examples.

Further, the luminance difference and the luminance gradient are set to zero at an angle number not extracted and identified as the defect candidate region.

In the defect determination step, the defect determination portion 10 determines a defect using the RNN (Recurrent Neural Network) based on the acquired first waveform data of the luminance.

That is, a luminance gradient b1 of the image numbered with the angle number 18 of the as-cast surface and the luminance gradient b1 of the image numbered with the angle number 22 of the machined surface are large, but the luminance difference a1 of the as-cast surface is small and the luminance difference a2 of the machined surface is large.

Therefore, the defect determination portion 10 determines that the image numbered with the angle number 18 of the as-cast surface is non-defective (a stain) and the image numbered with the angle number 22 of the machined surface is defective (a defect).

The defect determination portion 10 also makes the determination with respect to the images numbered with the other extracted and identified angle numbers in a similar manner.

Figure 16:
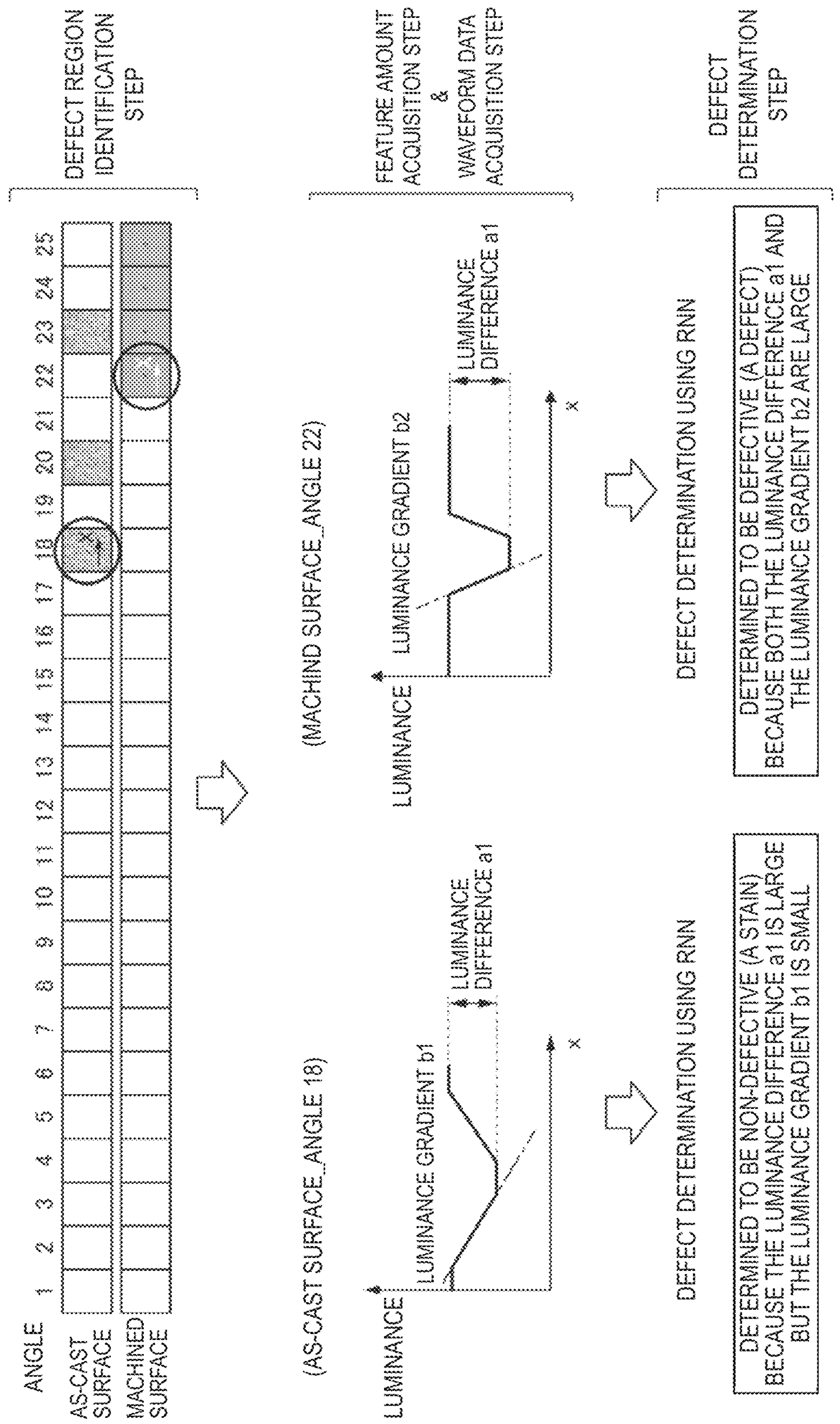
FIG. 16 is a second time chart illustrating the operation of the defect inspection method according to the sixth embodiment.

FIG. 16 is a second time chart illustrating the operation of the defect inspection method according to the sixth embodiment.

More specifically, FIG. 16 illustrates the operation of the defect inspection method on the as-cast surface and the machined surface of the piston 5.

In the defect candidate region identification step, the region extraction portion 8*a* extracts and identifies images numbered with angle numbers 18, 20, and 23 as the defect candidate regions for the as-cast surface, and extracts and identifies images numbered with angle numbers 22 to 25 as the defect candidate regions for the machined surface.

In the feature amount acquisition step and the waveform data acquisition step, the feature amount acquisition portion 8 acquires the images numbered with the angle numbers 18, 20, and 23 of the as-cast surface and the images numbered with the angle numbers 22 to 25 of the machined surface extracted and identified as the defect candidate regions by the region extraction portion 8*a*, and entirely scans the pixel region of each of them, thereby acquiring the luminance difference and the luminance gradient. Then, the waveform data acquisition portion 9 acquires the first waveform data and the second waveform data in which the luminance difference and the luminance gradient are arranged in the order of the change in the relative pose (the angle), respectively.

FIG. 16 illustrates the first waveform data and the second waveform data of the angle number 18 of the as-cast surface and the angle number 22 of the machined surface as representative examples.

Further, the luminance difference and the luminance gradient are set to zero at an angle number not extracted and identified as the defect candidate region.

In the defect determination step, the defect determination portion 10 determines a defect using the RNN (Recurrent Neural Network) based on the acquired first waveform data and second waveform data of the luminance.

That is, the luminance gradient b1 of the image numbered with the angle number 18 of the as-cast surface is small and a luminance gradient b2 of the image numbered with the angle number 22 of the machined surface is large, and the luminance difference a1 of the as-cast surface and the luminance difference a1 of the machined surface are large.

Therefore, the defect determination portion 10 determines that the image numbered with the angle number 18 of the as-cast surface is non-defective (a stain) because the luminance difference a1 is large but the luminance gradient b1 is small, and the image numbered with the angle number 22 of the machined surface is defective (a defect) because both the luminance difference a1 and the luminance gradient b2 are large.

The defect determination portion 10 also makes the determination with respect to the images numbered with the other extracted and identified angle numbers in a similar manner.

Next, advantageous effects of the sixth embodiment will be described.

The sixth embodiment brings about the following advantageous effects in addition to the advantageous effects of the first embodiment.

(1) The sixth embodiment is configured to use both the luminance difference (the first feature amount) and the luminance gradient (the second feature amount) as the feature amounts. Therefore, the sixth embodiment further improves the determination accuracy due to an increase in the information amount.

Seventh Embodiment

Figure 17:
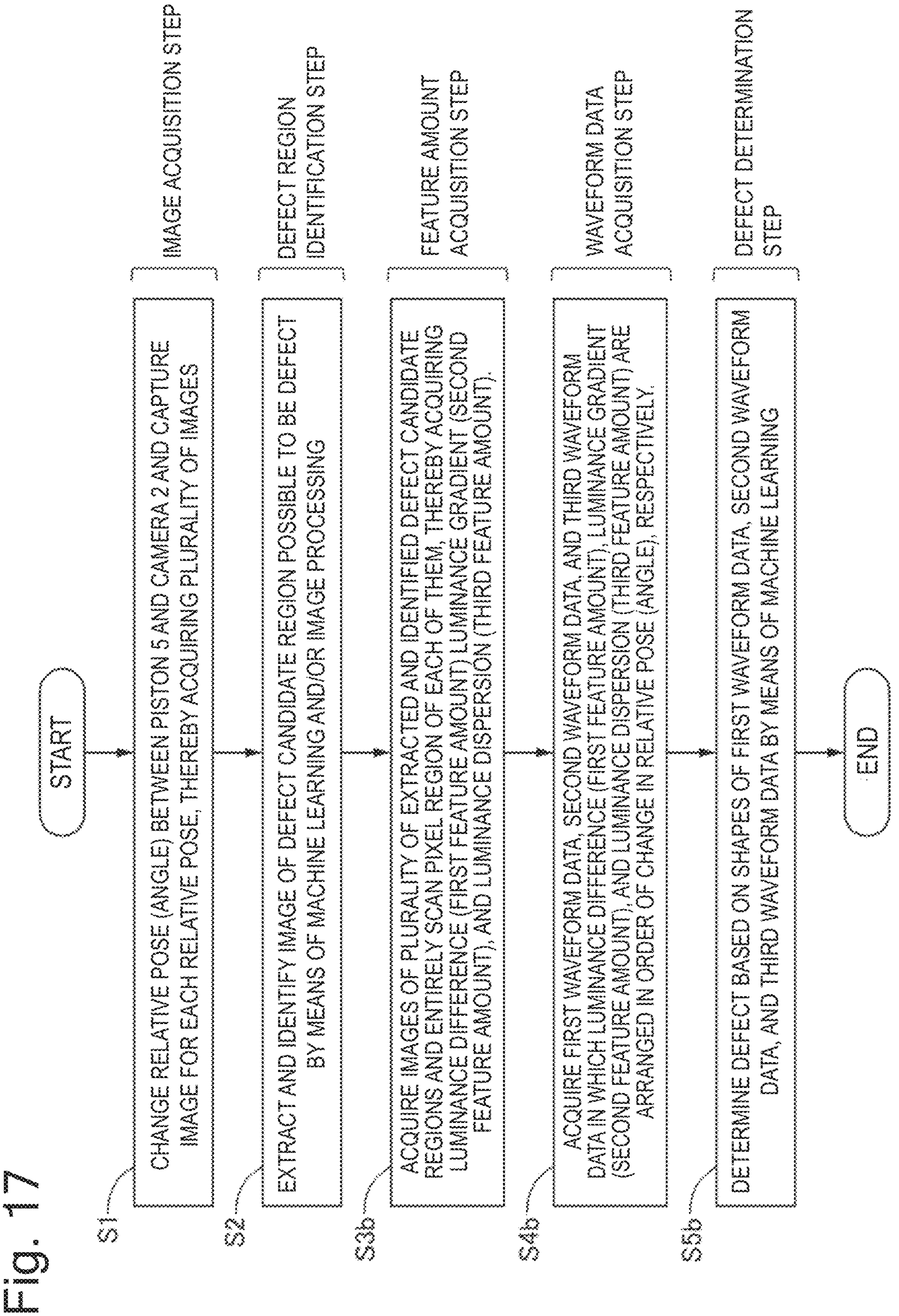
FIG. 17 is a flowchart illustrating the flow of a defect inspection method according to a seventh embodiment.

FIG. 17 is a flowchart illustrating the flow of a defect inspection method according to a seventh embodiment.

The sixth embodiment uses the first feature amount and the second feature amount but the seventh embodiment is configured to use a third feature amount in addition to the first feature amount and the second feature amount.

More specifically, in step S3*b*, the feature amount acquisition portion 8 acquires the plurality of images of the defect candidate regions extracted and identified by the region extraction portion 8*a*, and entirely scans the pixel region of each of them, thereby acquiring the luminance difference (the first feature amount), the luminance gradient (the second feature amount), and the luminance dispersion (the third feature amount). In step S4*b*, the waveform data acquisition portion 9 acquires the first waveform data, the second waveform data, and third waveform data in which the luminance difference (the first feature amount), the luminance gradient (the second feature amount), and the luminance dispersion (the third feature amount) are arranged in the order of the change in the relative pose (the angle), respectively. In step S5*b*, the defect determination portion 10 determines a defect based on the shapes of the first waveform data, the second waveform data, and the third waveform data by means of the machine learning.

Other than that, the seventh embodiment is configured similarly to the sixth embodiment, and therefore similar components to the sixth embodiment will not be described here while being indicated by the same reference numerals.

Figure 18:
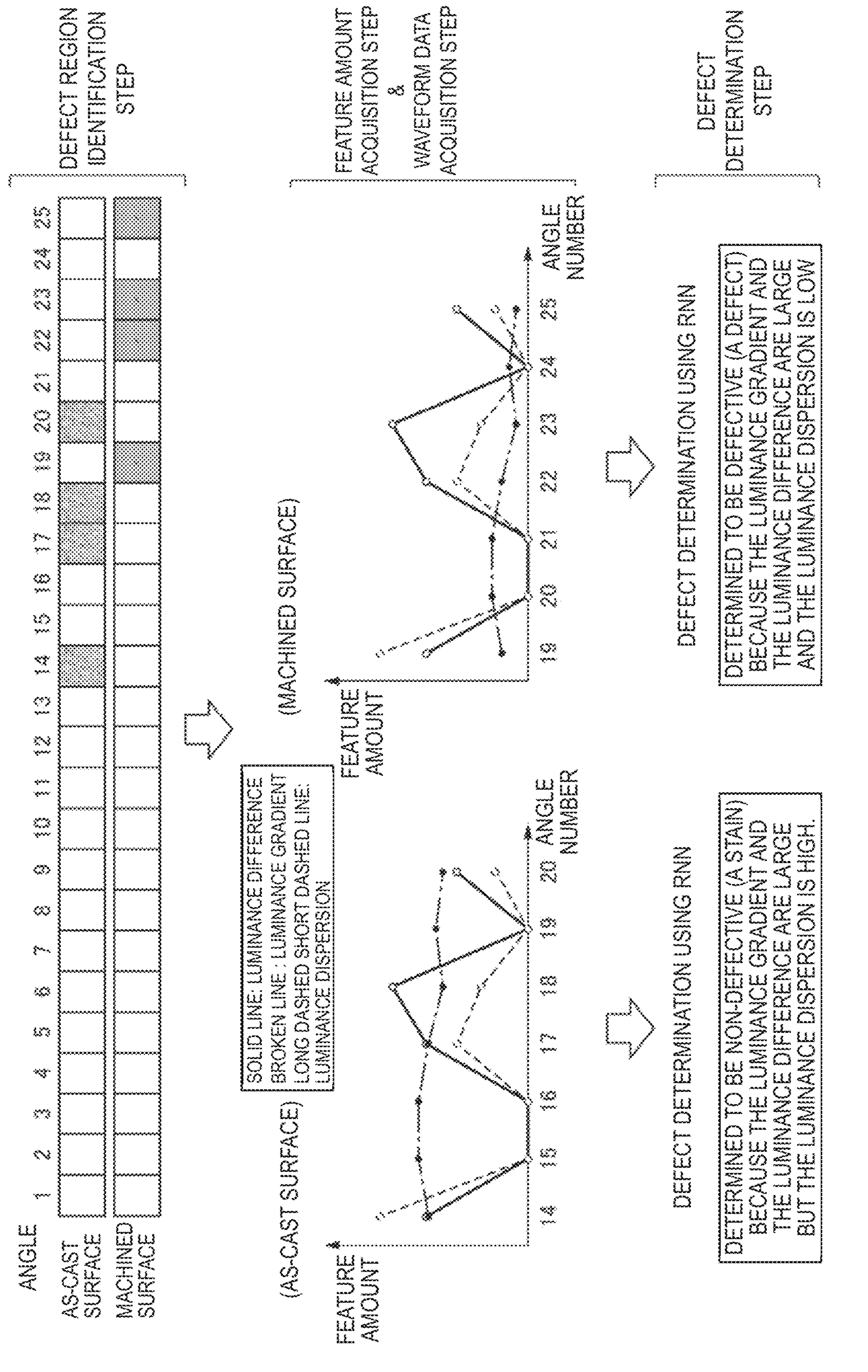
FIG. 18 is a time chart illustrating the operation of the defect inspection method according to the seventh embodiment.

FIG. 18 is a time chart illustrating the operation of the defect inspection method according to the seventh embodiment.

More specifically, FIG. 18 illustrates the operation of the defect inspection method on the as-cast surface and the machined surface of the piston 5.

In the defect candidate region identification step, the region extraction portion 8*a* extracts and identifies images numbered with angle numbers 14, 17, 18, and 20 as the defect candidate regions for the as-cast surface, and extracts and identifies images numbered with angle numbers 19, 22, 23, and 25 as the defect candidate regions for the machined surface.

In the feature amount acquisition step and the waveform data acquisition step, the feature amount acquisition portion 8 acquires the images numbered with the angle numbers 14, 17, 18, and 20 of the as-cast surface and the images numbered with the angle numbers 19, 22, 23, and 25 of the machined surface extracted and identified as the defect candidate regions by the region extraction portion 8*a*, and entirely scans the pixel region of each of them, thereby acquiring the luminance difference, the luminance gradient, and the luminance dispersion. Then, the waveform data acquisition portion 9 acquires the first waveform data, the second waveform data, and the third waveform data in which the luminance difference, the luminance gradient, and the luminance dispersion are arranged in the order of the change in the relative pose (the angle), respectively.

The luminance difference, the luminance gradient, and the luminance dispersion are set to zero at an angle number not extracted and identified as the defect candidate region.

In the defect determination step, the defect determination portion 10 determines a defect using the RNN (Recurrent Neural Network) based on the acquired first waveform data, second waveform data, and third waveform data of the luminance.

That is, the defect determination portion 10 determines that the as-cast surface is non-defective (a stain) because the luminance gradient and the luminance difference are large but the luminance dispersion is high, and the machined surface is defective (a defect) because the luminance gradient and the luminance difference are large and the luminance dispersion is low.

Next, advantageous effects of the seventh embodiment will be described.

The seventh embodiment brings about the following advantageous effects in addition to the advantageous effects of the sixth embodiment.

(1) The seventh embodiment is configured to use all the luminance difference (the first feature amount), the luminance gradient (the second feature amount), and the luminance dispersion (the third feature amount) as the feature amounts.

Therefore, the seventh embodiment further improves the determination accuracy due to an increase in the information amount.

Eighth Embodiment

Figure 19:
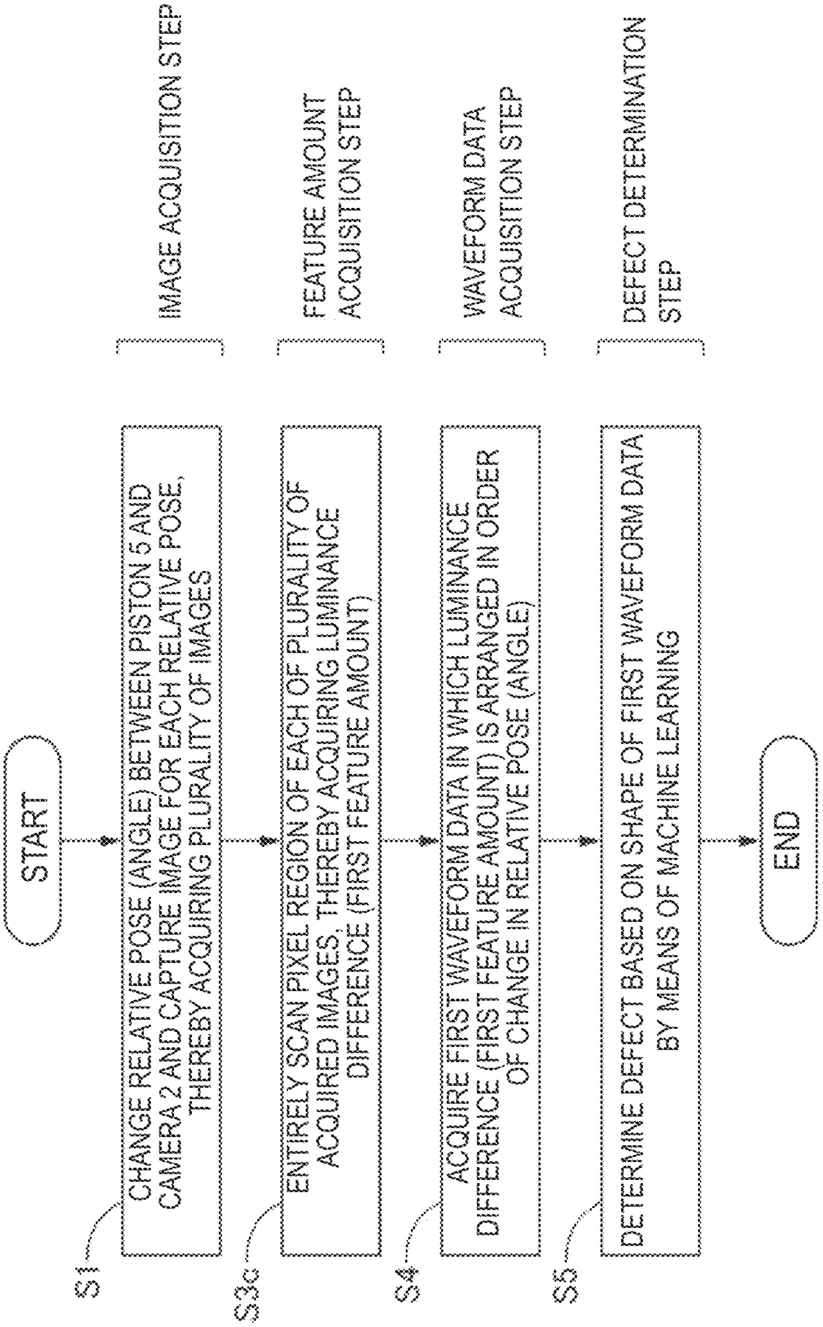
FIG. 19 is a flowchart illustrating the flow of a defect inspection method according to an eighth embodiment.

FIG. 19 is a flowchart illustrating the flow of a defect inspection method according to an eighth embodiment.

The region extraction portion 8*a* extracts and identifies the defect candidate regions using the CNN (Convolutional Neural Network) to acquire the luminance difference (the first feature amount) in the first embodiment, but is configured to entirely scan the pixel region of each of the images at the plurality of angles to acquire the luminance difference (the first feature amount) in the eighth embodiment.

Other than that, the eighth embodiment is configured similarly to the first embodiment, and therefore similar components to the first embodiment will not be described here while being indicated by the same reference numerals.

Next, the advantageous effects of the eighth embodiment will be described.

The eighth embodiment brings about the following advantageous effects in addition to the advantageous effects of the first embodiment.

(1) The eighth embodiment is configured not to use the CNN (Convolutional Neural Network) of the region extraction portion 8*a* for extracting and identifying the defect candidate regions in the computer 4.

Therefore, the eighth embodiment can reduce the cost of the computer 4.

Other Embodiments

Having described the embodiments for implementing the present invention, the specific configuration of the present invention is not limited to the configurations of the embodiments, and the present invention also includes even a design modification and the like thereof made within a range that does not depart from the spirit of the present invention, if any.

For example, the inspection target is not limited to the piston, and the machine learning is not limited to the CNN (Convolutional Neural Network) and the RNN (Recurrent Neural Network).

Further, the pose control portion changes the pose of the piston by means of the robot, but may fulfill this intended purpose by changing the position of the camera.

The present application claims priority under the Paris Convention to Japanese Patent Application No. 2022-98638 filed on Jun. 20, 2022. The entire disclosure of Japanese Patent Application No. 2022-98638 filed on Jun. 20, 2022 including the specification, the claims, the drawings, and the abstract is incorporated herein by reference in its entirety.

REFERENCE SIGNS LIST

1 defect inspection apparatus
2 camera (imaging portion)
3 robot
4 computer
5 piston (inspection target)
6 CPU
7 image acquisition portion
8 feature amount acquisition portion
8*a* region extraction portion
9 waveform data acquisition portion
10 defect determination portion

The invention claimed is:

1. A defect inspection apparatus configured to determine a defect of an inspection target, the defect inspection apparatus comprising:

an image acquisition portion configured to change a relative pose between the inspection target and an imaging portion and capture an image each time the relative pose is changed, thereby acquiring a plurality of images;

a feature amount acquisition portion configured to acquire a specific feature acquired by scanning each of the plurality of images as a first feature amount;

a waveform data acquisition portion configured to acquire first waveform data in which the first feature amount is arranged in an order of a change in the relative pose; and a defect determination portion configured to determine the defect according to the first waveform data.

2. The defect inspection apparatus according to claim 1, wherein the first feature amount is one of a luminance, a luminance gradient, a geometric characteristic, a luminance dispersion, and a color intensity acquired by scanning each of the plurality of images.

3. The defect inspection apparatus according to claim 2, wherein the feature amount acquisition portion acquires one of the luminance, the luminance gradient, the geometric characteristic, the luminance dispersion, and the color intensity that is other than the first feature amount, as a second feature amount, wherein the waveform data acquisition portion acquires second waveform data in which the second feature amount is arranged in the order of the change in the relative pose, and wherein the defect determination portion determines the defect using both of the first waveform data and the second waveform data.

4. The defect inspection apparatus according to claim 3, wherein the feature amount acquisition portion acquires one of the luminance, the luminance gradient, the geometric characteristic, the luminance dispersion, and the color intensity that is other than the first feature amount and the second feature amount, as a third feature amount, wherein the waveform data acquisition portion acquires third waveform data in which the third feature amount is arranged in the order of the change in the relative pose, and wherein the defect determination portion determines the defect using the three pieces of waveform data, the first waveform data, the second waveform data, and the third waveform data.

5. The defect inspection apparatus according to claim 2, wherein the first feature amount is a luminance difference, and a difference between a maximum value and a minimum value of luminances acquired by scanning each of the images is used.

6. The defect inspection apparatus according to claim 2, wherein the first feature amount is the luminance gradient, and a maximum value of luminance gradients acquired by scanning each of the images is used.

7. The defect inspection apparatus according to claim 3, wherein the first feature amount is a luminance difference and the second feature amount is the luminance gradient.

8. The defect inspection apparatus according to claim 4, wherein the first feature amount is a luminance difference, the second feature amount is the luminance gradient, and the third feature amount is the luminance dispersion.

9. The defect inspection apparatus according to claim 2, wherein the first feature amount is the geometric characteristic of a pixel region having a predetermined or lower luminance that is acquired by scanning each of the images.

10. The defect inspection apparatus according to claim 1, wherein the feature amount acquisition portion includes a region extraction portion configured to extract a defect candidate region possible to be the defect from each of the plurality of images using machine learning, and wherein the first feature amount is a specific feature acquired by scanning the defect candidate region.

11. The defect inspection apparatus according to claim 1, wherein the first feature amount is a specific feature acquired by entirely scanning a pixel region of each of the plurality of images.

12. A defect inspection method by which a defect inspection apparatus determines a defect of an inspection target, the defect inspection method comprising:

causing the defect inspection apparatus to perform an image acquisition step of changing a relative pose between the inspection target and an imaging portion and capturing an image each time the relative pose is changed, thereby acquiring a plurality of images;

a feature amount acquisition step of acquiring a specific feature acquired by scanning each of the plurality of images as a first feature amount;

a waveform data acquisition step of acquiring first waveform data in which the first feature amount is arranged in an order of a change in the relative pose; and a defect determination step of determining the defect according to the first waveform data.

* * * * *